(12) United States Patent
Peng et al.

(10) Patent No.: US 9,367,948 B2
(45) Date of Patent: Jun. 14, 2016

(54) FLEXIBLE FILTER LOGIC FOR MULTI-MODE FILTERING OF GRAPHICAL TEXTURE DATA

(71) Applicants: Liang Peng, San Jose, CA (US); Yoav Harel, Folsom, CA (US); Steven Spangler, El Dorado Hills, CA (US)

(72) Inventors: Liang Peng, San Jose, CA (US); Yoav Harel, Folsom, CA (US); Steven Spangler, El Dorado Hills, CA (US)

(73) Assignee: INTEL CORPORATION, Santa Clara, CA (US)

( * ) Notice: Subject to any disclaimer, the term of this patent is extended or adjusted under 35 U.S.C. 154(b) by 235 days.

(21) Appl. No.: 14/080,441

(22) Filed: Nov. 14, 2013

(65) Prior Publication Data

US 2015/0130818 A1     May 14, 2015

(51) Int. Cl.
  G09G 5/00      (2006.01)
  G06T 15/04    (2011.01)
  G06T 11/00    (2006.01)
  G06T 1/60      (2006.01)

(52) U.S. Cl.
  CPC .............. *G06T 15/04* (2013.01); *G06T 11/001* (2013.01); *G06T 1/60* (2013.01)

(58) Field of Classification Search
  None
  See application file for complete search history.

(56) References Cited

U.S. PATENT DOCUMENTS

| | | | |
|---|---|---|---|
| 6,366,290 B1 * | 4/2002 | Dye | G06T 15/04 345/582 |
| 7,477,261 B2 | 1/2009 | Pallister | |
| 7,719,544 B2 | 5/2010 | Boyd et al. | |
| 2003/0151608 A1 * | 8/2003 | Chung | G06T 1/20 345/506 |
| 2006/0250407 A1 * | 11/2006 | Xu | G06T 15/04 345/582 |
| 2007/0008333 A1 * | 1/2007 | Xu | G06T 15/04 345/582 |
| 2011/0292048 A1 * | 12/2011 | Chien | G06T 15/04 345/426 |

FOREIGN PATENT DOCUMENTS

JP     2006-244426 A     9/2006

OTHER PUBLICATIONS

Nickolls et al., "Graphics and Computing GPUs", Computer Organization and Design: The hardware/Software Interface, D. A. Patterson and J. L. Hennessy, 4th ed., Morgan Kaufmann, 2009, 76 pages.
Office Action and translation for Japanese Patent Application 2014-210112, mailed Sep. 29, 2015, 5 pages.
Philip Rideout, "iPhone 3D Programming, 1st ed.", O'Reilly Japan Inc., Mar. 11, 2011, 1st ed., pp. 176-180.

* cited by examiner

*Primary Examiner* — Jacinta M Crawford
(74) *Attorney, Agent, or Firm* — Lynch Law Patent Group, P.C.

(57) ABSTRACT

Multi-mode texture filters suitable for performing both bilinear filtering based on a fractional texture address and generating a weighted average of a group of texel values based on predetermined texel weighting coefficients as dependent on a filter mode signal. In embodiments, the weighted average may be accumulated over a variety of filter footprints. In embodiments, multi-mode texture filter logic includes a plurality of flexible filter blocks. In further embodiments, a pair of flexible filter blocks staged with each performing one lerp phase in the bilinear filter mode while a pair of flexible filter blocks in the flexible filter mode generate a weighted average over a pair of texels of a texel quad. In embodiments, each flexible filter block has a same microarchitecture, enabling an efficient utilization in either bilinear filter or flexible filter mode.

16 Claims, 20 Drawing Sheets

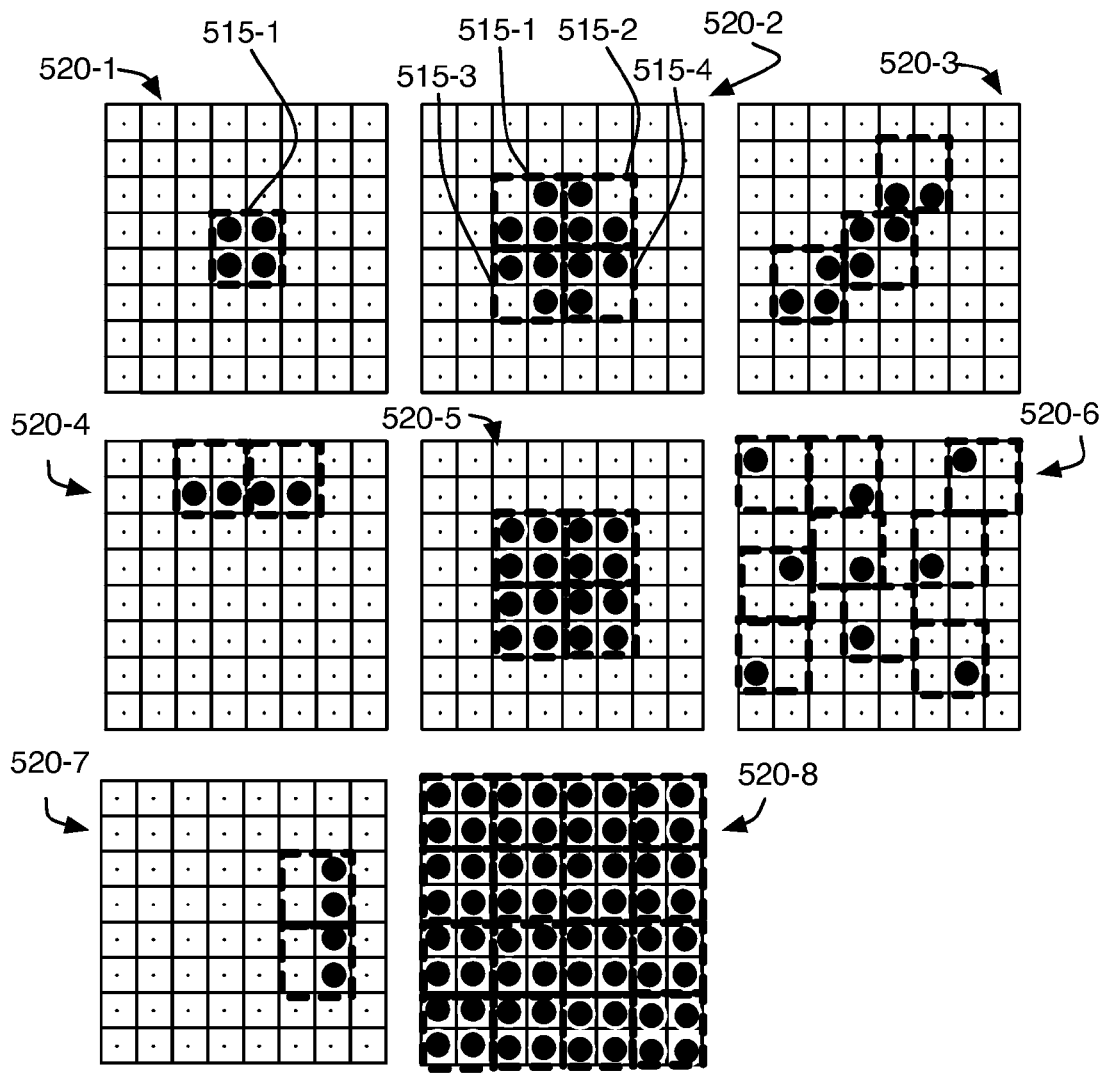
FIG. 5A
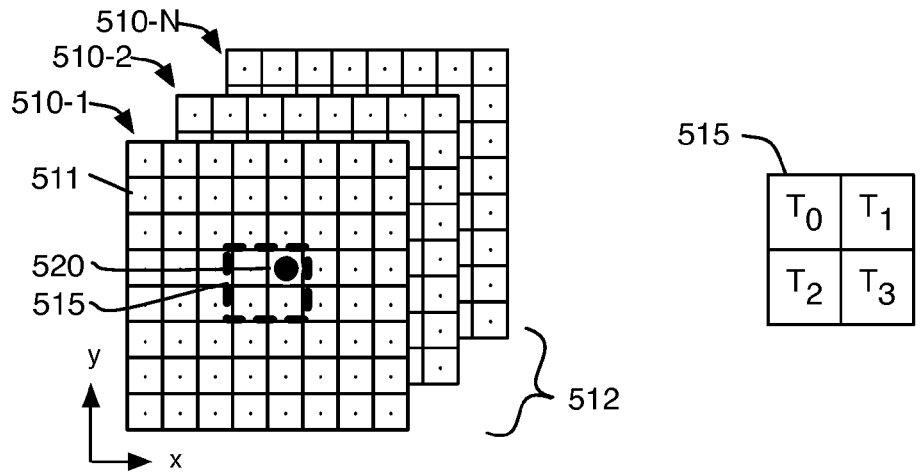
FIG. 5B  FIG. 5C

| H-Coeff. Table 671 |||||||||||
|---|---|---|---|---|---|---|---|---|---|---|
| $\beta_u$ | Tap$_0$ | Tap$_1$ | Tap$_2$ | Tap$_3$ | Tap$_4$ | Tap$_5$ | Tap$_6$ | Tap$_7$ | ••• | Tap$_{n-1}$ |
| .0 | HC[0:0] | HC[1:0] | | | | | | | | |
| .1 | HC[0:1] | HC[1:1] | ••• | | | | | | | |
| ⋮ | | | | | | | | | | |
| 1-Δβ$_u$ | | | | | | | | | | |

FIG. 6C

| V-Coeff. Table 672 |||||||||||
|---|---|---|---|---|---|---|---|---|---|---|
| $\beta_v$ | Tap$_0$ | Tap$_1$ | Tap$_2$ | Tap$_3$ | Tap$_4$ | Tap$_5$ | Tap$_6$ | Tap$_7$ | ••• | Tap$_{n-1}$ |
| .0 | VC[0:0] | VC[1:0] | | | | | | | | |
| .1 | VC[0:1] | VC[1:1] | ••• | | | | | | | |
| ⋮ | | | | | | | | | | |
| 1-Δβ$_v$ | | | | | | | | | | |

FIG. 6D

FLEXIBLE FILTER LOGIC FOR MULTI-MODE FILTERING OF GRAPHICAL TEXTURE DATA

TECHNICAL FIELD

Embodiments of the implementation generally relate to computer graphics, and more particularly relate to sampling and filtering of texture data.

BACKGROUND

Graphics rendering, particularly for three dimensional (3D) graphics applications, is one of the most processing intensive activities performed by personal computers. Graphics co-processors are available on most modern day personal computers. FIG. 1A, is a system 100 employing a graphics processor 101 and a central processor 102, each coupled to a system memory 103 (e.g., DRAM, eDRAM, etc.) by a bus. Central processor 102 and graphics processor 101 may be disposed on a single piece of silicon (i.e., a single-chip solution), or integrated at a package, board, or system level. Graphics processor 101 includes a plurality of parallel processing sub-systems, or slices 105. Each slice 105 may be replicated any number of times for greater parallel graphics processing power. Within slice 105, there are a number of execution units (EU) 110, also known as "shader cores," or simply "cores." Each EU 110 contains scalar integer and floating-point arithmetic units that execute instructions. Each EU 110 has an instruction set architecture (ISA), may support context switching and pre-emptive multi-tasking, and may be essentially a complete x86 core, for example. Along with EUs 110, slice 105 includes a level two (L2) cache 130 (e.g., SRAM, eDRAM, etc.) and texture sampler 120. Texture sampler 120 includes fixed function logic (e.g., state machines). Texture sampler 120 may communicate with EU 110 via cache 130. Cache 130 may function as a texture cache that is a read-only memory to texture sampler 120 holding large arrays of predetermined texture data for use in texture mapping when a graphic is rendered for display by a platform hosting system 100.

The transformation of scene information (source data) into displayable images requires a number of functionalities, referred to in aggregate as a 3D graphics rendering pipeline. FIG. 1B is flow diagram depicting certain operations particular to a texture mapping portion of the graphics rendering pipeline. Texture mapping 101 generally entails imaging a textured signal onto a primitive's geometry, for example giving the appearance of pixel-level detail on more coarsely rendered polygon meshes that are manipulated on a vertex basis. At operation 105, texture coordinates are assigned to vertices of a given polygon. Generally, a texture is a digital image comprising an array of texels (texture elements), which may be individually addressed based on location within a two-dimensional (u,v) coordinate space, or in a three-dimensional (u,v,s) coordinate space. In the (u,v) coordinate space, u is the width and v is the height, and may be mapped between 0 and 1 based on the texture width and height. At operation 107 the texture coordinates are interpolated at each pixel within the polygon. At operation 111, a texture color at each pixel is fetched into cache based on the interpolated texture coordinate. At operation 113, the texture is sampled and filtered to arrive at a particular texel color at each pixel. Often, there is a disparity between a number of sample texture elements (texels) and the source texture image and the number of picture elements (pixels) to which the image is mapped. If a texture is too large or too small for a given polygon, the texture is filtered to fit the space. A magnification filter enlarges (zooms-in) a texture, a minification filter reduces (zooms-out) the texture to fit into a smaller area. Texture magnification maps few texels to many pixels by repeating the sampled texel for a plurality of addresses, for example providing a blurrier image. Texture minification maps many texels to few pixels by combining more than one texel value into a single value. This can cause aliasing or jagged edges, and antialiasing techniques become important to reduce visual artifacts. The goal of texture filtering then is to compute the average value of the image over an area around each pixel, for example through averaging of many texels associated with a given pixel.

Texture filtering has largely been performed by fixed-function logic found in texture sampler 120. Such texture samplers have a fixed filter footprint (shape) associated with a type of texture filtering, such as point sampling, bi-linear filtering, tri-linear filtering, and anisotropic filtering. As the filtering methods become increasingly complex, and as uses for texture data continues to expand, for example being used for lighting and other surface properties in addition to color, a sampler with a fixed-function filter has become inefficient and/or insufficient. As such, shader programs instantiated by EU 110 have taken larger roles in texture mapping, for example resulting in the architecture of system 106 illustrated in FIG. 1C. In system 106, EU 110 implements a filter footprint 140 in an application layer, and a plurality of texture requests in (u,v) space associated with footprint 140 are sent to the texture sampler 120. Texture sampler 120 then fetches texture data 115 into the cache for each of the (u,v) addresses associated with filter footprint 140. EU 110 executing instructions defined in the application layer then accumulates texture data 115. As such, texture data for an entire footprint is passed through the texture sampler with no data reduction because filtering is off-loaded from fixed-function logic 131 onto EU 110. In this configuration however, sampler chip area occupied by fixed-function logic 131 is wasted. Another issue with this architecture is reduced cache usage efficiency. With multiple sampler messages sent from a kernel there's a higher probability that the interleaved messages from multiple EUs will cause many cache evictions. Furthermore, texture mapping bandwidth is potentially constrained with the greater amount of data communicated between EU 110 and texture sampler 120 since texture data is not significantly processed and/or reduced by texture sampler 120. Another disadvantage of the system architecture depicted in FIG. 1C is that filtering performed by EU 110 may require more power and may be slower than if implemented with optimized, purpose-built logic within texture sampler 120. Therefore, the programmability afforded with shader-based filtering may be particularly disadvantageous for mobile devices executing graphics-intensive applications where the greater power demand translates into reduced battery life.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 5A illustrates a variety of exemplary programmable footprints that may be implemented through application of a texel quad performed as part the method depicted in FIG. 4, in accordance with embodiments FIG. 5B depicts a plurality of footprints and corresponding bounding regions that may be employed in a multi-mode flexible texture sampler when performing the method depicted in FIG. 4, in accordance with embodiments;

FIG. 5C depicts a texel quad representing a minimum granularity of a multi-mode flexible texture sampler, in accordance with embodiments;

FIGS. 6C and 6D illustrates filter coefficient tables that may be populated in preparation of performing the separable filter method depicted in FIG. 6A, in accordance with embodiments;

DETAILED DESCRIPTION

Figure 1A:
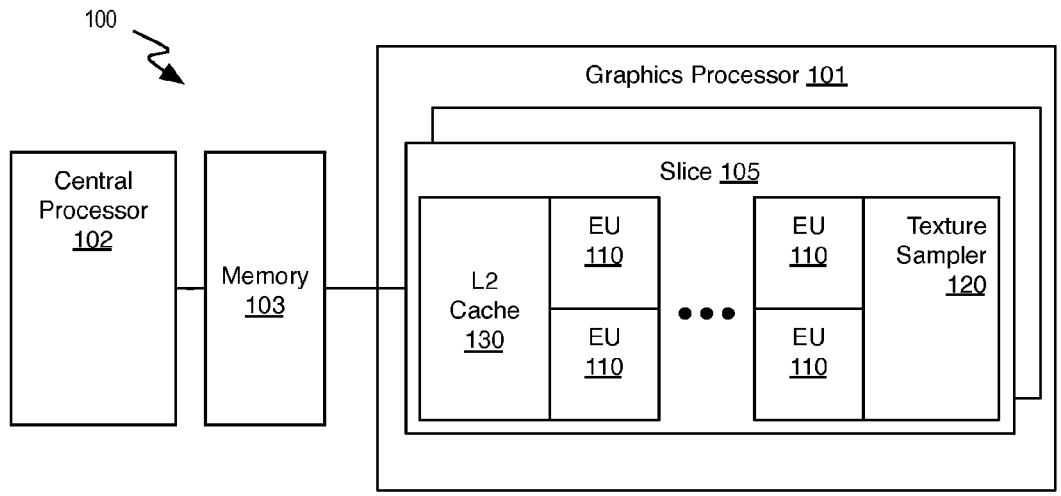
FIG. 1A, is a conventional system architecture including a central processor and a graphics processor.
Figure 1B:
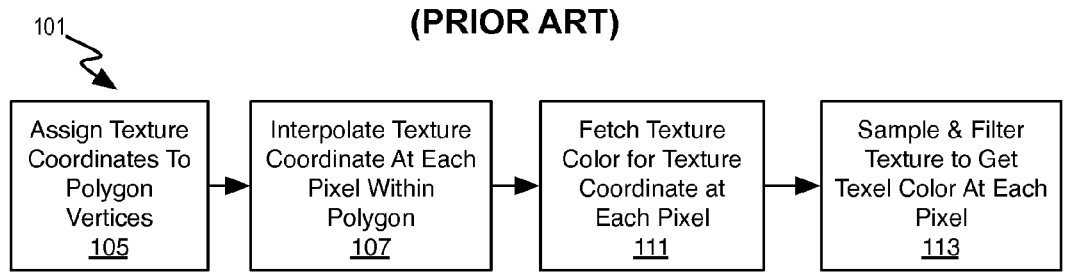
FIG. 1B is flow diagram depicting particular texture mapping operations in a typical graphics rendering pipeline within a graphics processor.
Figure 1C:
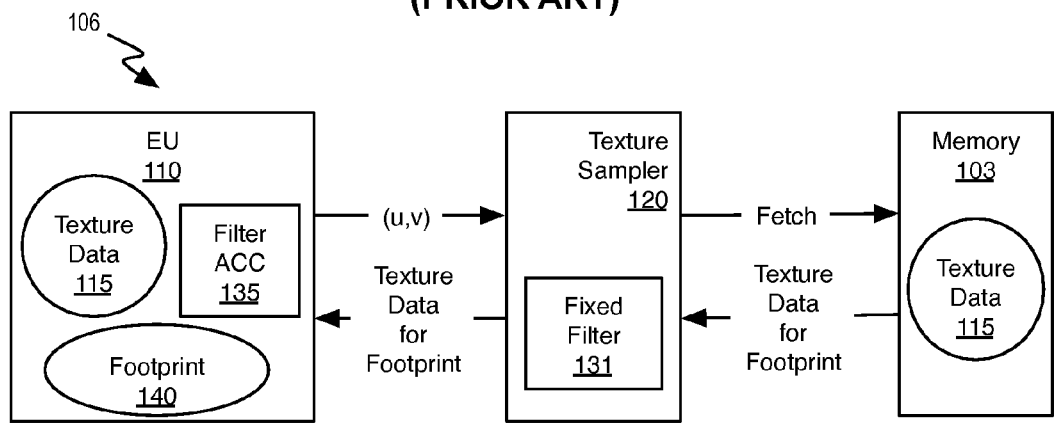
FIG. 1C is a conventional graphics processor architecture employing a shader for texture filtering.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications other than what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that the present implementation may be practiced without these specific details. Well-known methods and devices are shown in block diagram form, rather than in detail, to avoid obscuring the present implementation. Reference throughout this specification to "an embodiment" or "one embodiment" means that a particular feature, structure, function, or characteristic described in connection with the embodiment is included in at least one embodiment of the implementation. Thus, the appearances of the phrase "in an embodiment" or "in one embodiment" in various places throughout this specification are not necessarily referring to the same embodiment of the implementation. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the implementation and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used in throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth various implementations that may be manifested in architectures such system-on-a-chip (SoC) architectures or graphics processors for example, implementation of the techniques and/or arrangements described herein are not restricted to particular architectures and/or computing systems and may be implemented by any architecture and/or computing system for similar purposes. For example, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein are implemented in hardware, for example as logic circuitry in a graphics processor. Certain other portions may be implemented in hardware, firmware, software, or any combination thereof. At least some of the material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

Figure 1D:
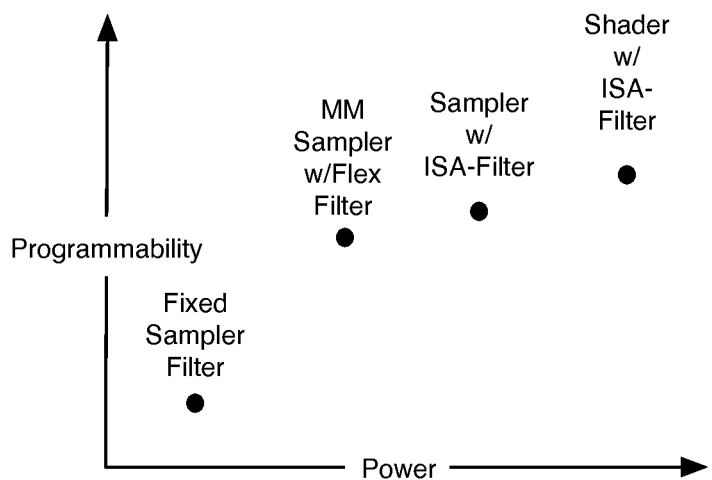
FIG. 1D is a graph comparing certain texture filtering architectures that may be utilized in a graphics processor.
Figure 1E:
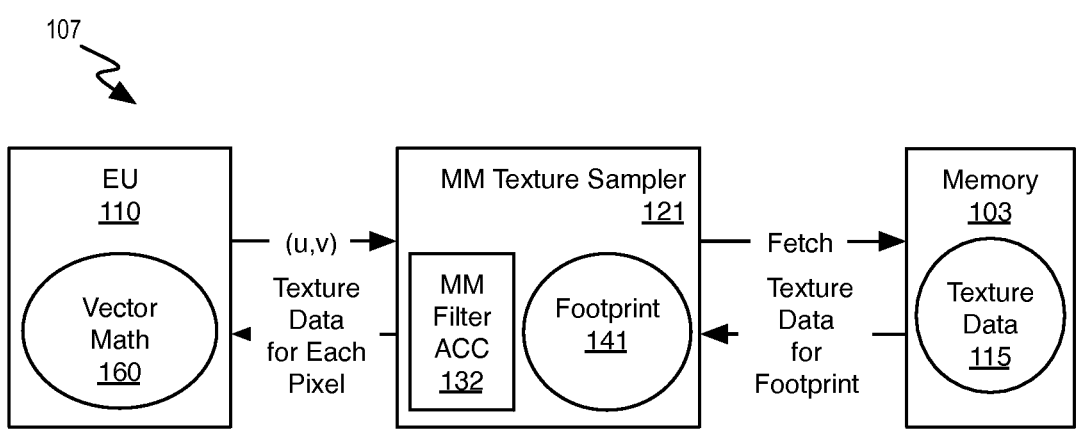
FIG. 1E is a graphics processor architecture employing a multi-mode texture sampler, in accordance with an embodiment.

Systems, apparatus, articles, and methods are described below including a multi-mode texture sampler capable of flexible filtering operations providing a high performance and low power solution for 2D and 3D visual computing applications. FIG. 1D is a graph comparing certain sampler architectures that may be employed by a graphics processor with respect to their relative power requirements and programmability. Near the origin is a fixed function sampler filter, offering for example a bi-linear texture filter. Highly optimized filter function logic may implement such a filter very economically for lowest power and high efficiency. However, the lack of programmability of this filter is unable to accommodate any application-specific filter. On the other extreme is the shader implementing an fully programmable ISA filter, which may accommodate any application-specific filtering operation but consumes the most power. One step down in power and programmability from the shader filter is a sampler with an ISA filter within sampler. For such an architecture, the sampler has some of the functionality currently found in a shader core/EU (e.g., a programmable register-based scalar instruction set, integer, logic, flow control, and memory access) in addition to the conversion and special functions typical of texture operations. The ISA filter in sampler can be expected to require power similar to the shader-core filter implementation and the greater sampler complexity requires significant increases in chip area. For further comparison, the power and programmability attributes of the exemplary multi-mode (MM) sampler with a flexible filter in accordance with embodiments herein is also depicted in FIG. 1E. The MM sampler embodiments described herein provide a significant increase in filter programmability, indeed arguably enabling the sampler to perform most any texture filtering currently implemented on an ISA filter. However, with only a slight increase in power, if any, relative to a fixed function sampler.

Relative to shader-based filters, the multi-mode texture sampler embodiments described herein may further provide more balanced heterogeneous computing, for example as depicted in the graphics processor architecture 107 of FIG. 1E. In exemplary architecture 107, EU 110 is to perform vector math 160, higher-level rendering algorithms, and memory writes, etc. When texture mapping is needed, a texture address (u,v) is communicated to a multi-mode (MM) texture sampler 121. For a given texture address, MM texture sampler 121 is to fetch texture data 115 for a variety of footprints 141, and reduce texture data 115 by processing with MM filter accumulator 132. MM filter accumulator 132 is suitable for providing output values corresponding to a weighted average over the variety of filter footprints 141. MM texture sampler 115 returns to the EU 110 reduced data corresponding a sampled, filtered pixel color (R/G/B) at each pixel. Unlike a fixed-function texture sampler, MM texture sampler 121 is configurable to accommodate both a wide variety of footprints and allow for a footprint to be significantly wider than the bi-linear (2×2 texel) footprint often employed in fixed-function minification filtering. The MM texture sampler 121 can require less power and reduced EU-to-sampler communication while still providing a greater level functionality, such as lighting/shadowing effects, heretofore available only through shader-based filters. In exemplary embodiments, in addition to supporting flexible footprints, MM texture sampler 121 further supports legacy fix-function modes, such as point and/or linear sampling, and bilinear and/or trilinear filter modes.

Figure 2:
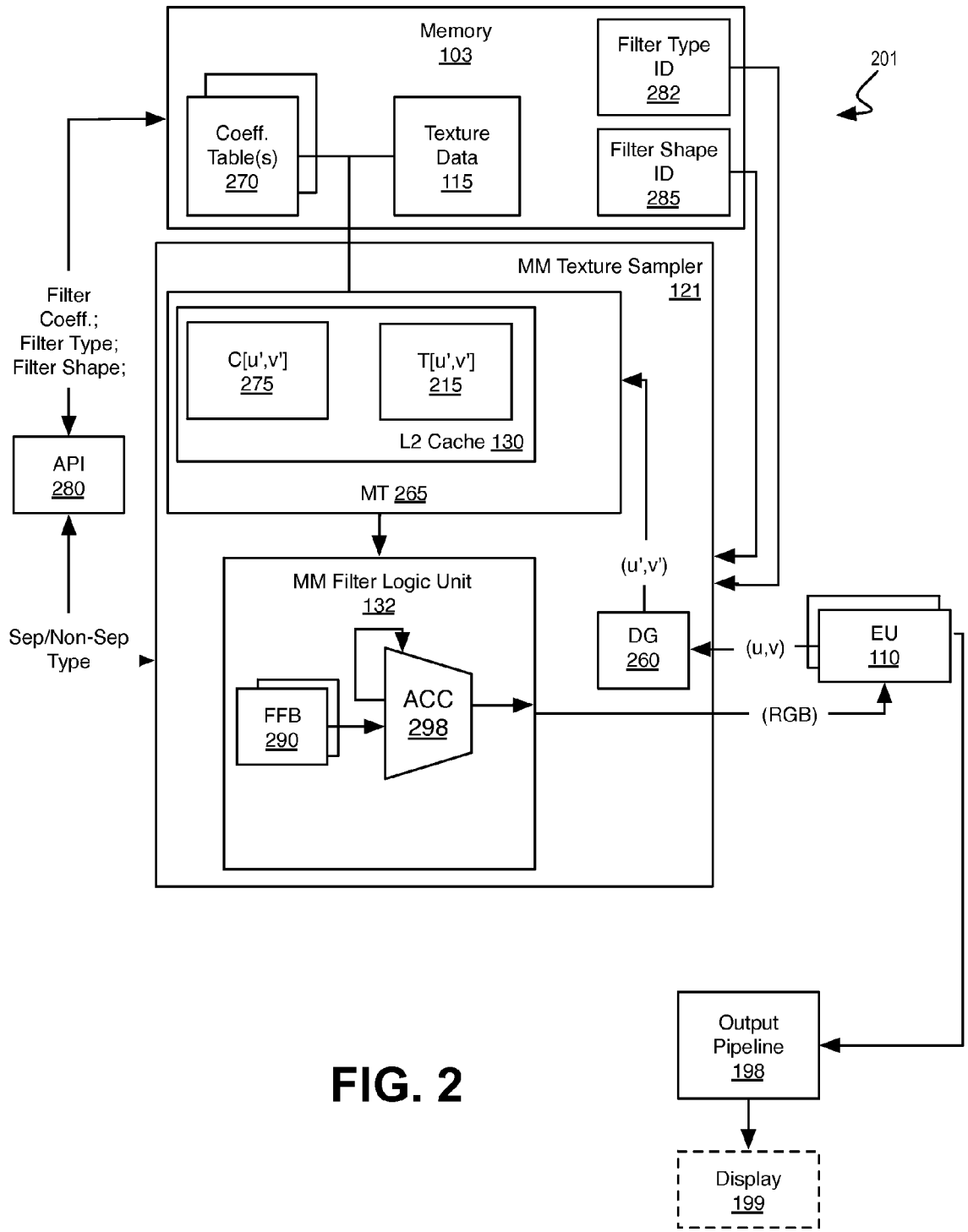
FIG. 2 is a functional block diagram further illustrating a system including a graphics processor with a multi-mode flexible texture sampler, in accordance with an embodiment.

FIG. 2 is a functional block diagram further illustrating a system 201 including a graphics processor employing multi-mode flexible texture sampler 121, in accordance with an embodiment. System 201 includes one or more EU 110 communicatively coupled to MM texture sampler 121. EU 110 is to provide an input texture address or coordinate, for example in (u,v) space, to MM texture sampler 121. While two dimensional texture addresses are employed in the description herein, it is noted that the techniques and hardware described herein may be adapted to greater dimensionality (e.g., 3D) by one of ordinary skill. MM sampler 121 includes a logic circuitry represented as data generator (DG) 260, which is to generate texel sampling addresses (i.e. sub-samples) based on the input texture address and a based further on a desired filter footprint. The sub-sample addresses (u',v') generated by DG 260 identify one or more texel sub-sampling position within a predetermined bounding region within which a footprint is defined. Sub-sampling addresses (u',v') are sequenced and passed to multi-thread (MT) unit 265, which is to fetch data into cache 130 and handle overhead associated with the cache FIFO (e.g., locality-based fetching, latency, cache misses, etc.). In embodiments herein, MT unit 265 caches texel data T[u',v'] 215 associated with each sub-sample address. Whereas a conventional fixed function sampler may be called upon to dynamically calculate filter coefficients for an input texture address, for example through a bi-linear interpolation algorithm, MT unit 265 further caches predetermined filter (weighting) coefficients 275 associated with each (u',v') sub-sample address (i.e., C[u',v']).

Filter coefficients 275 are an additional input to MM texture sampler 121. Filter coefficients 275 may be stored in memory 103, entered for example as one or more coefficient tables 270 through API 280. API 280 may be implemented for example as a set of extensions to an existing graphics processor API, such as, but not limited to, DirectX and OpenGL. API 280 exposes coefficient tables 270 to an application layer and may allow the tables to be populated with predetermined values appropriate for a given filter. As one example, an application layer routine that evaluates a Gaussian blur function may be executed to automatically generate coefficients values stored in coefficient tables 270. Fixed memory allocations for storing values in coefficient table(s) 270 may be made based on the size of the predetermined bounding region within which a footprint is defined, as well as the mode of the MM texture sampler.

In embodiments, MM texture sampler 121 is selectively operable in both a separable filter mode and a non-separable filter mode for any of a plurality of programmable filter footprints. In the exemplary embodiment, the non-separable filter mode implements the filter function, $$F = \sum_{x=0}^{m} \sum_{y=0}^{m} C_{xy} T_{xy}$$

where $C_{xy}$ is the filter coefficient for a given sampled address (u',v') and $T_{xy}$ is the texel (color) value for the given sampled address (u',v'). The weighting is generally performed over the entire bounding region, m, which is predetermined to be some fixed size sufficient to implement all desired footprints. In one exemplary embodiment, m=7, allowing for up to an 8×8 texel footprint to be defined. For such embodiments, coefficient table 270 includes one coefficient for each texel within the bounding region m. MM texture sampler 121 is further operable in a separable filter mode. In one exemplary embodiment, the separable filter mode implements the filter function:

$$F = \sum_{y=0}^{h-1} \sum_{x=0}^{w-1} H_{A,x} V_{B,y} T_{xy}$$

where $H_{A,x}$ is a horizontal filter coefficient, $V_{B,y}$ is a vertical filter coefficient for a given filter width w and height h defined within the predetermined bounding region. As for non-separable coefficient $C_{x,y}$, values of separable coefficients $H_{A,x}$ and $V_{B,y}$ may be stored in coefficient table(s) 270 as source data for cache fetches. While both the separable and non-separable filter modes are further described below in the context of the above exemplary filter functions, it is noted one of ordinary skill in the art may adapt the architecture and techniques described herein to another non-separable and/or separable filter function.

In embodiments, API 280 further exposes a filter type ID 282 that is indicative of the mode in which MM texture sampler 121 is to operate while remaining in a given state. For example, filter type ID 282 may store a flag bit, etc. specifying the non-separable or separable filter mode. In further embodiments, API 280 may additionally expose a filter shape ID 285. MM sampler 121, and more specifically DG 260, may utilize the filter shape ID 285 to efficiently generate contributing sub-sample addresses (i.e., those addresses within the predetermined bounding region having non-zero filter coefficients). In one embodiment of the separable filter mode, filter shape ID 285 stores the filter height h and width w of the separable filter. In one embodiment of the non-separable filter mode, filter shape ID 285 stores a bit mask that specifies filter coefficients within the bounding region that are non-zero. Such a bit mask may be generated, by a graphics processor driver for example, based on entries in the coefficient table(s) 270.

As further illustrated in FIG. 2, MM texture sampler 121 includes MM filter logic (FL) unit 132, which performs filtering and returns a color value (e.g., R/B/G, R/B/G/A, etc.) at each pixel based on the filter mode, filter footprint, texel values, and filter coefficient values. This returned value may then be utilized in output pipeline 198 and output to display 199 (or utilized in a hidden layer calculation, etc.). MM FL 132 includes flexible filter block (FFB) 290 having logic circuitry to perform filtering over any flexible footprint provided in either separable or non-separable filter modes. MM FL 132 further includes accumulator 298 that is to accumulate a plurality of flexible filter block outputs to generate a weighted average over a given flexible filter footprint. MM FL 132 may further include a divider (not depicted) to normalize output from FFB 290 or accumulator 298 before returning the filter value to EU 110. As such, MM FL 132 is configurable to perform weighted accumulation on colors of all texels within the footprint, for example as defined by filter type ID 282, and/or filter shape ID 265. In further embodiments, as described elsewhere herein, MM FL 132 is sufficiently generalized to also perform conventional bi-linear filtering at a rate unimpeded by the more flexible architecture of MM FL unit 132.

A more detailed description of the texture data processing techniques and microarchitecture of components introduced in exemplary system 201 are now discussed in turn.

Flexible Filter Footprints

Figure 3:
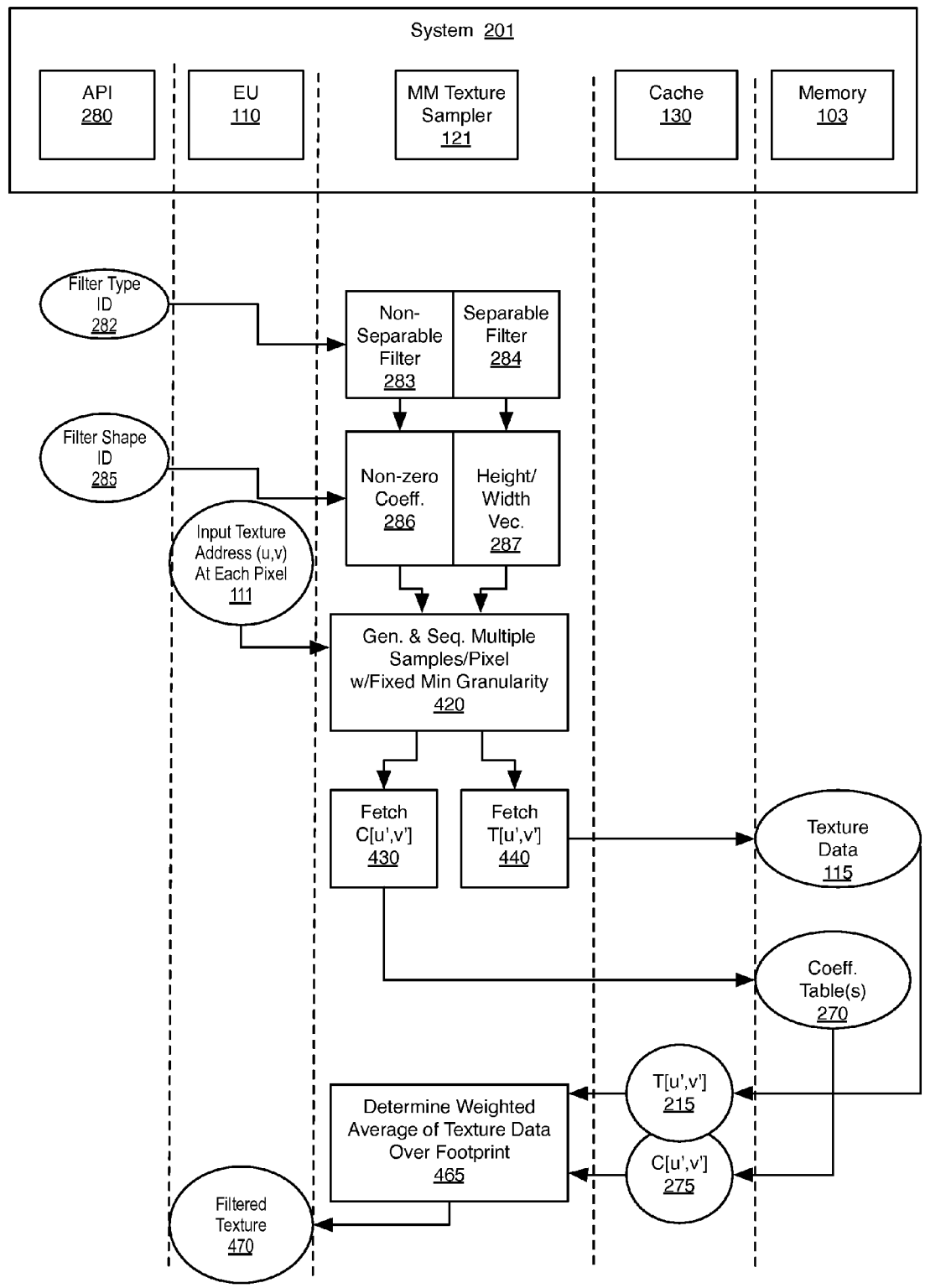
FIG. 3 illustrates how multi-mode flexible texture filtering methods may be performed by a system having an architecture as in FIG. 2, in accordance with embodiments.

FIG. 3 illustrates how multi-mode flexible texture filtering methods may be performed by the system 201 having the architecture as depicted in FIG. 2, in accordance with embodiments. Dotted lines in FIG. 3 demark exemplary functional partitions between the various components of system 201 to illustrate an association between certain actions and particular components of exemplary system 201 responsible for conducting the action. As shown, non-separable or separable filtering modes 283, 284 of the MM texture sampler 121 are specified through API 280 by filter type ID 282. Filter shape may be further parameterized either through a masking of zero value coefficients 286 or with filter shape ID 285 specifying height and width filter vectors 287. Upon receiving a seeding input texture address 111 at each pixel from EU 110, multiple (sub)samples at each pixel are generated and sequenced at operation 420, as described in further detail below. At operation 430, MM texture sampler 121 fetches predetermined filter coefficient values 215 for each generated sub-sample into cache 130, for example from stored coefficient tables 270. At operation 440, MM texture sampler 121 fetches predetermined texel data values 215 for each generated sub-sample into cache 130, for example from stored texture data 115. At operation 465, MM texture sampler 121 determines a weighted average of the color values over the entire footprint, for example by implementing one of the filter functions above, and returns to EU 110 a filtered, sampled texture 470.

Figure 4:
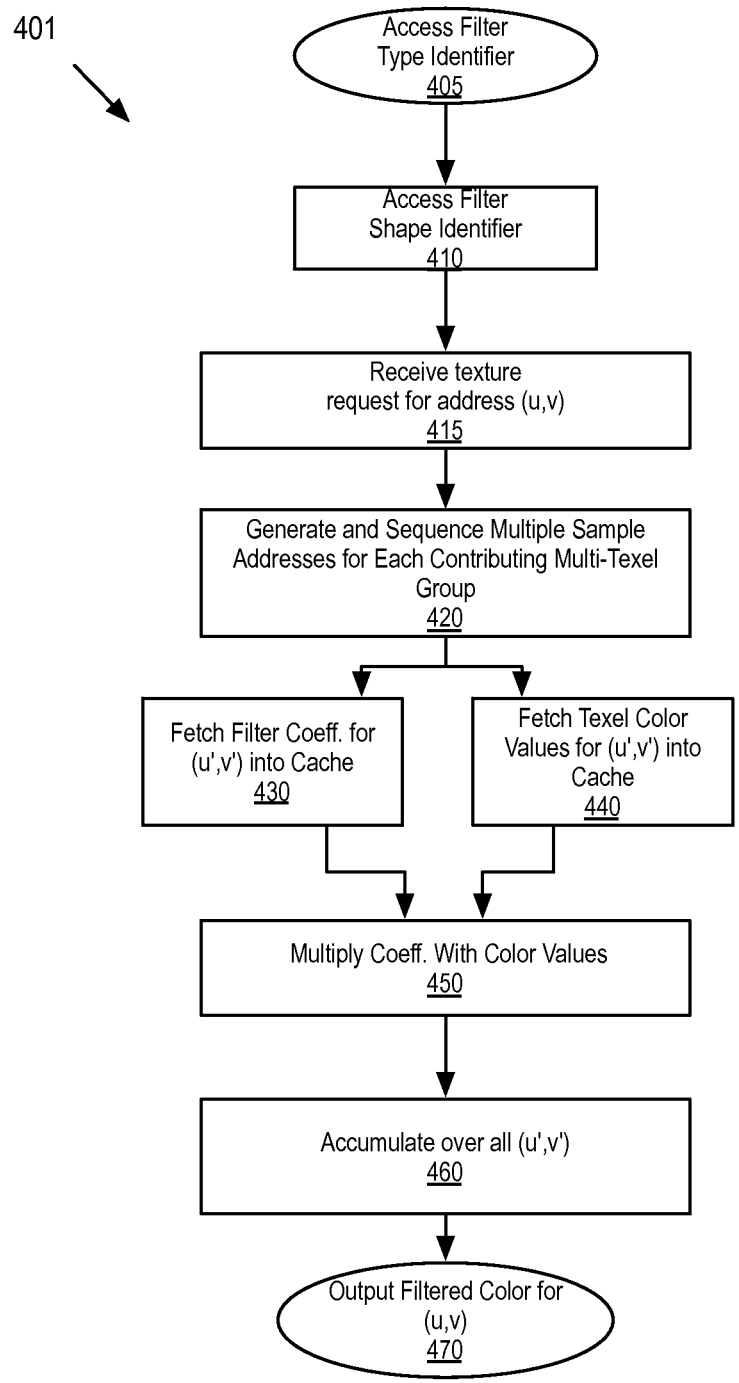
FIG. 4 is a flow diagram illustrating a multi-mode flexible texture filter method, in accordance with embodiments.

Further explanation of an exemplary multi-mode flexible texture filter method 401 is described in the context of FIG. 4. In accordance with the exemplary embodiment, method 401 is performed by the system 201 depicted in FIG. 2. In accordance with other embodiments, a texture sampler having an arbitrary alternative hardware architecture performs method 401. For example, a texture sampler having only one of a separable and non-separable filter mode may nonetheless implement certain aspects of the method 401. In accordance with still other embodiments, a graphics processor having alternate arrangements of logic circuitry and application software may perform method 401. For example, a texture sampler may implement only some of the functions described in the context of FIG. 4 in hardware while other functions are implemented in software. As such, while in one embodiment the method 401 is performed by system 201, system 201 is not required to perform method 401 and system 201 need not perform every operation of method 401.

Method 401 begins at operation 405 with a texture sampler accessing a filter type identifier to determine whether to enter a non-separable filter state or a separable filter state. At operation 410, for either a non-separable or a separable filter, the texture sampler may further access a filter shape identifier to determine the filter footprint parameters. A footprint includes all texels that contribute to a filtered texture value. FIG. 5A illustrates a variety of exemplary footprints that may be "programmed" within the exemplary 8×8 bounding regions, in accordance with embodiments. A large dot in FIG. 5A represents an output texel sample associated with a non-zero filter coefficient that therefore contributes to the particular filtered value, while a small dot is a non-contributing texel associated a zero-valued coefficient. Notably, because embodiments herein enable designation of a vast number of arbitrary footprints, the eight examples depicted in FIG. 5A do not represent an exclusive listing, but instead are merely to show the great variety of permissible filter shapes and sizes. Filter footprint 520-1 for example has the same size as a conventional bi-linear interpolation filter footprint, while footprint 520-2 is useful for a Gaussian filter. Footprints 520-3, 520-4, and 520-7 are all exemplary anisotropic filter shapes. Footprint 520-5 is useful for a bi-cubic filter), and footprint 520-8 illustrates a maximum 8×8 texel filter.

In the exemplary embodiment, any of a plurality of filter footprints may be defined within a predetermined bounding region. A particular footprint may be associated with a given sampler state, permitting a filter footprint changes with each sampler state change, if desired. The number of different filter footprints possible for a given texture sampler is therefore scalable with the number of filter states that are permissible. FIG. 5B depicts a plurality of footprints 512 that may each be associated with a given state of a multi-mode flexible texture sampler, in accordance with embodiments. For each of footprints 512, there are a fixed number of texels 511 within an 8×8 bounding region (e.g., 510-1, 510-2, 510-N). This dimensionality may vary however as an implementation detail. In one illustrative embodiment, a first filter footprint, suitable for an anisotropic filter, is applied in one filter state, while another footprint suitable for a Gaussian filter is applied in another filter state.

Returning to FIG. 4, upon receiving a texture request at operation 415, for example in the form of a texture address from a shader core, the texture sampler generates a sequence of texel sub-sample addresses (u',v') at operation 420 based on the filter footprint. The filter footprint is applied to the input texture address (u,v) by referencing the sampling positions associated with the footprint to the input texture address. In the exemplary embodiment, the bounding region (e.g., 510-1 in FIG. 5B) is centered at the input texture address (u,v) with output sampling positions then referenced to addresses (u',v'). In embodiments, sub-sample addresses (u',v') are generated for each of a predetermined number of samples associated with a group of neighboring texels that contain at least one contributing texel. This group of neighboring texels represents a minimum granularity for generation of output samples from any given input address and any given footprint. In one embodiment, this minimum granularity is a texel quad, or 2×2 of neighboring texels. FIG. 5C depicts the exemplary texel quad 515 inclusive of texels $T_0$, $T_1$, $T_2$, and $T_3$ represented by a 2×2 of sampling addresses. Embodiments herein leverage the texel quad as an atomic addressing unit advantageous in many respects because of the significant amounts of sampler logic circuitry designed to efficiently utilize pixel locality. For example, values associated with a 2×2 address sequence can be efficiently fetched into a single cache line from memory. Hence, even where a footprint includes only one texel, such as depicted in FIG. 5B, a sequence of four sub-sample addresses (u',v') are generated. For example, in texel quad 515 that contains one contributing texel specified by footprint 520, one sub-sample address for each of texel $T_0$, $T_1$, $T_2$, and $T_3$ is generated for a given input texture address (u,v).

Dashed boxes in FIG. 5A further illustrate exemplary texel quads for each illustrated footprint. For example, footprint 520-2 results in generation of four texel quads: 515-1; 515-2; 515-3; and 515-4. For each quad 515-1 through 515-4, four sub-sample addresses are generated for a total of 16 sub-samples for a given input texture address (u,v). Similarly, footprint 520-3 results in generation of 12 (u',v') sub-sample addresses corresponding to three texel quads. Generation of sub-sample address may proceed over a single or multiple clock cycles. In further embodiments, logic circuitry within the texture sampler (e.g., within the data generator) internally sequences the sub-sample addresses following one or more algorithm to minimize the number of texel quads generated for a given footprint, and/or to maximize coherency of sampling positions, etc. In further advantageous embodiments, the bounding regions (e.g., 510-1, 510-2, 510-N in FIG. 5B) are dimensioned to contain an even multiple of the multi-texel sampling group of minimum granularity. For example, as shown in FIG. 5A, for an 8×8 texel bounding region, footprint 520-8 fills the bounding region and a sequence of 16 texel quads are generated corresponding to 64 output sub-sample addresses (u',v') for an input texture address (u,v) at each pixel.

Notably, any of the footprints depicted in FIG. 5A may be implemented in either separable or non-separable modes of the texture sampler. In the separable filter mode the footprint is defined as the product of two footprints in 1D space. The filter shape identifier may then be indicative of a 1D width vector associated with a first 1D footprint, and a 1D height vector associated with a second 1D footprint, for example.

The texture sampler then generates four sub-sample addresses for each texel quad containing at least one texel specified by a first 1D footprint having a first programmable number of texels (e.g., programmable width w) and a second 1D footprint having a second programmable number of texels (e.g., programmable height h). With the predetermined bounding region referenced to the input texture address (u,v), sub-sampling positions specified in the separable filter footprint may be addressed as (u',v').

In the non-separable filter mode where there is one coefficient $C_{xy}$ for each texel within the bounding region, four sub-sample addresses are generated for each texel quad that contains at least one texel having a non-zero coefficient value. In this mode, the filter coefficient table may serve to specify the footprint with the non-zero coefficient values being the only sampling positions contributing to the filter. For such embodiments, all coefficients may be read to generate a sequence of sub-sample addresses. In further embodiments, a sampling mask may be generated from the coefficient table. As one example, 16 bits may specify an 8×8 bounding region, with each bit of the mask indicating one or a few coherent sampling positions (e.g., one 2×2 quad) within the bounding region of the corresponding filter. Notably, with all the sub-sample addresses (u',v') now generated for all multi-texel groupings containing at least one contributing texel, processing of each sub-sample address can efficiently proceed through the filter logic circuitry for each input texture address communicated between shader core and texture sampler.

Returning to FIG. 4, method 401 continues with fetching filter coefficients into the cache. In embodiments, coefficient values are fetched for each texel sub-sample address in a manner dependent on the filter mode. While at least one filter coefficient is needed for each sub-sample address (u',v'), only one filter coefficient $C_{xy}$ is utilized in the non-separable filter mode while two filter coefficients $H_{A,x}$, $V_{B,y}$ are employed in the separable filter mode. Coefficient precision may vary with implementation. For example, 8 bit or 16 bit coefficients may be supported in either separable or non-separable modes. In one exemplary embodiment, multiple levels of precision (e.g., selectable between 8 bit and 16 bit) are supported for a coefficient (e.g., $C_y$). In certain separable mode embodiments, values from two coefficient tables (one for $H_{A,x}$ and one for $V_{B,y}$) are cached for each sub-sample address. Also, in certain non-separable filter mode embodiments, coefficients are accessed based only on the non-fractional portion of the input texture address with any fractional portions of an input texture address ($\beta_u$, $\beta_v$) ignored (e.g., rounded). Hence, non-separable filters may provide texel-level precision. For certain separable filter mode embodiments however, the cached coefficients values are based on (or a function of, or dependent on) the fractional portion of the input texture address. Such embodiments offer sub-texel precision. Further description of such fractional addressing for filter coefficients and other aspects of the separable filter mode are provided further below in the context of FIGS. 6A-6E following discussion of method 401.

Continuing in reference to FIG. 4, a texel color value corresponding to each sub-sample address (u',v') is fetched from memory into the texel data cache at operation 440. Any techniques known in the art may be utilized at operation 440 as embodiments are not limited in this respect. At operation 450 sub-sampled texture data is filtered based on the texel color value and coefficient value associated with each texel sub-sample address. For example, the filter function equation provided above may be implemented with filter logic circuitry that multiplies the filter coefficient (e.g., $C_{xy}$) at each sub-sample address (u',v') with the color value of the corresponding texel ($T_{xy}$) at each sub-sample address (u',v'). The resulting color value for each sub-sample address is then passed to an accumulator, which may also be implemented in the filtering logic circuitry of the sampler. In the accumulator, values are accumulated in each color channel (e.g., R/B/G) over all of the sub-sample addresses (u',v'). The accumulated color is then returned at operation 470 (e.g., to EU 110) as the sampled and filtered color for a pixel, which may also be packed along with filtered colors corresponding to other pixels. While method 401 is generally applicable to both non-separable and separable filter modes, various operations in method 401 (e.g., 420, 430, and 440) are dependent on the filter mode. Additional aspects particular to the separable filter mode are now described in greater detail in the context of FIGS. 6A-6E.

Figure 6A:
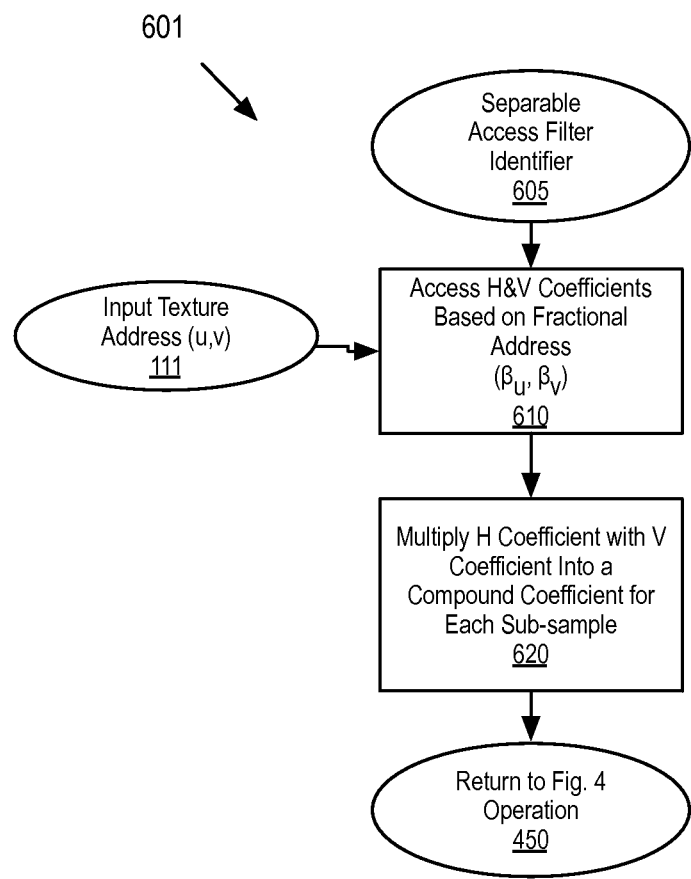
FIG. 6A is a flow diagram illustrating a separable texture filter method that may be implemented as the method depicted in FIG. 4 is performed, in accordance with particular separable filter embodiments.
Figure 6B:
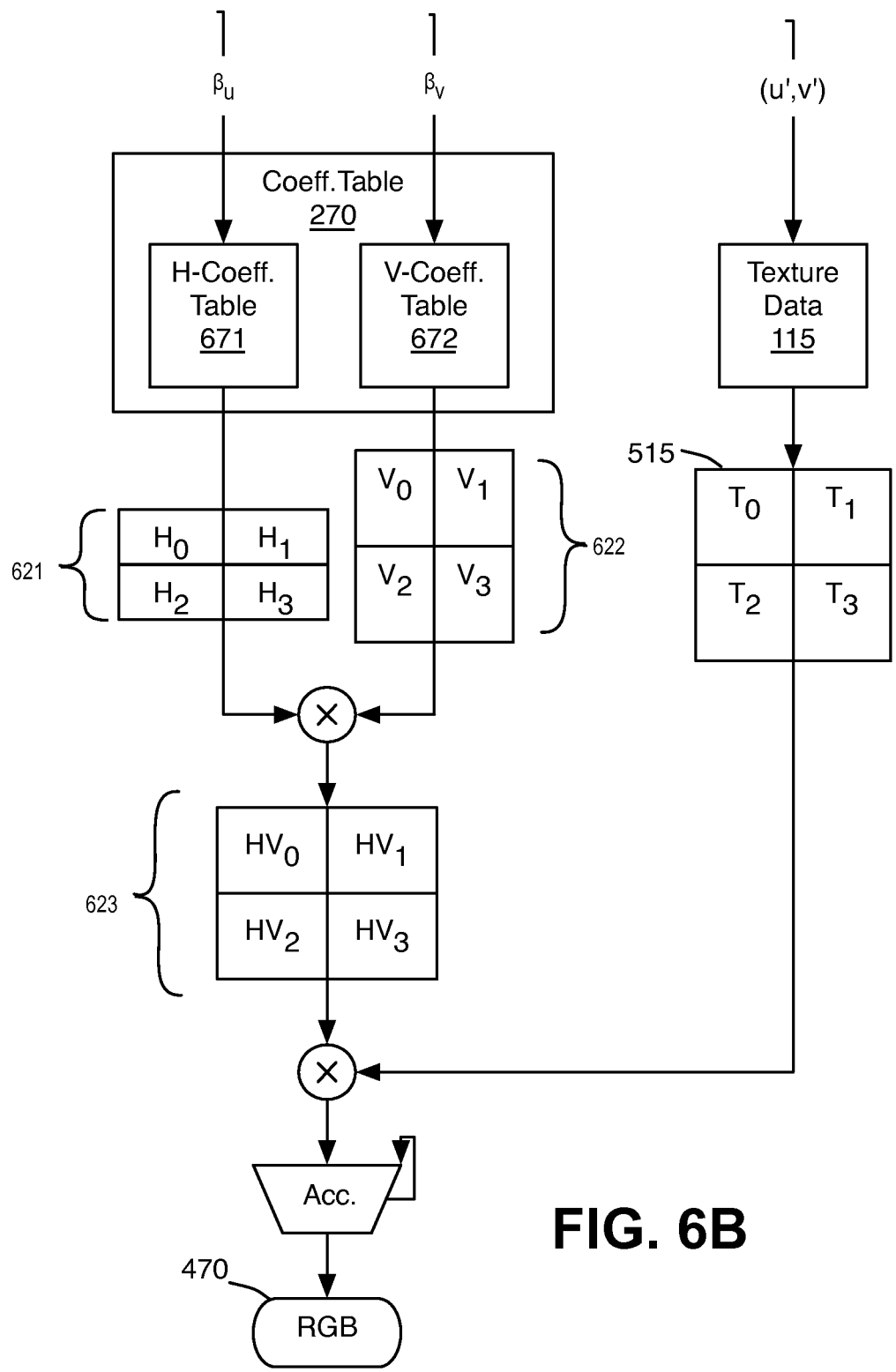
FIG. 6B illustrates a data pipeline as a separable texture filter method is performed by a system having an architecture as in FIG. 2, in accordance with embodiments.
Figure 6E:
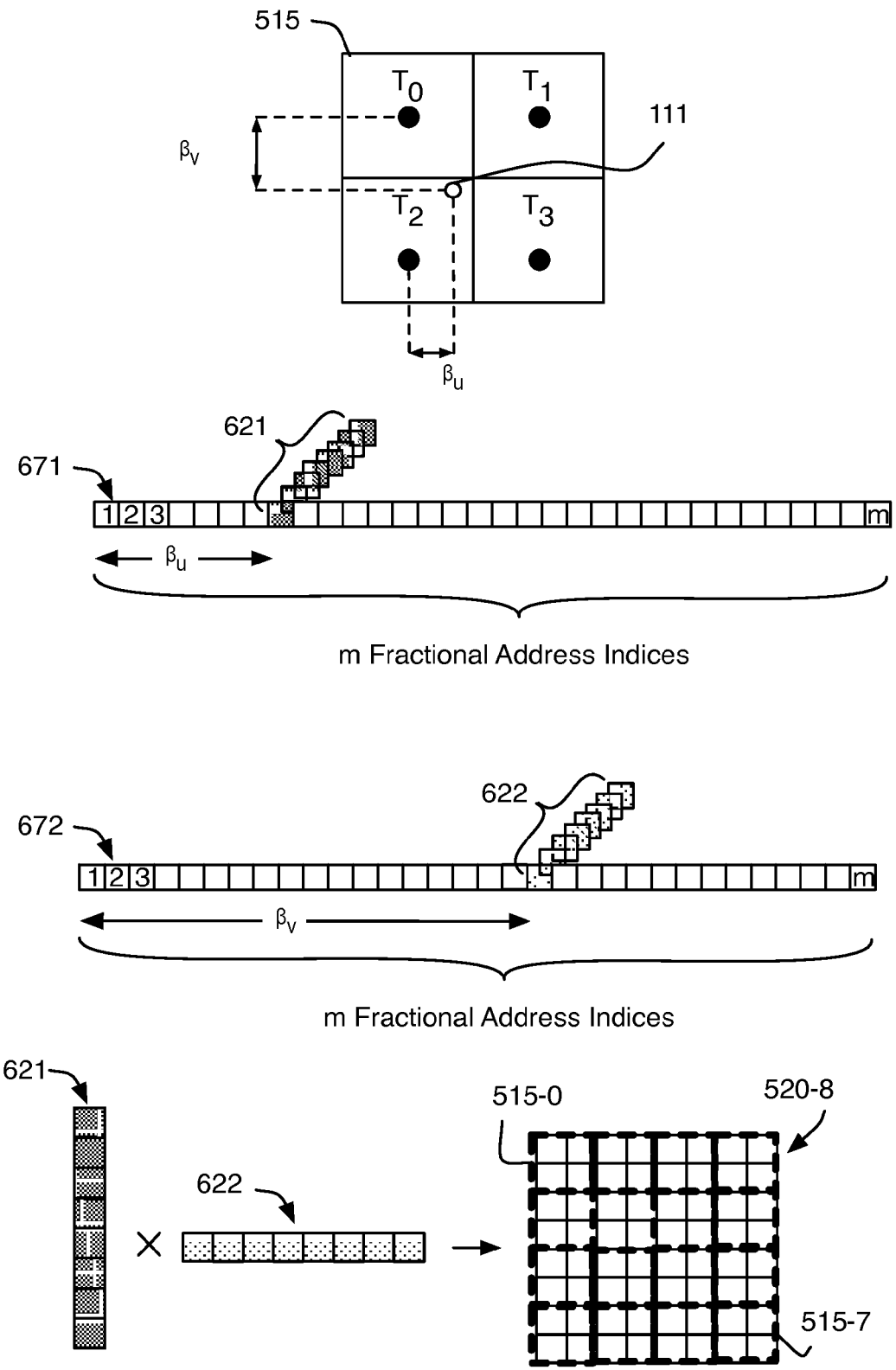
FIG. 6E illustrates a fractional address indexing of filter coefficient tables during execution of the separable filter method in FIG. 6A, in accordance with embodiments.

FIG. 6A is a flow diagram illustrating a separable texture filter method 601 that may be implemented as a portion of operation 430, in accordance with embodiments. Method 601 begins at operation 605 with an indication that the sampler is in the separable filter mode. At operation 610 horizontal and vertical coefficients are chosen from the vertical and horizontal coefficient tables with the fractional portion of the input texture address 111 ($\beta_u$ and $\beta_v$). These fractional address portions are illustrated in FIG. 6E for an input texture address 111 for the exemplary texel quad 515. As further illustrated in FIG. 6B, vertical coefficient table 671 is accessed based on $\beta_v$, and horizontal coefficient table 672 is accessed based on $\beta_u$. In embodiments, each of the coefficient tables 671, 672 have a set of coefficient values for each of a plurality of fractional address values. Each set indexed by a particular fractional address includes a coefficient value for each of the maximum number of texels permitted by the bounding region with non-zero coefficient values corresponding to filter taps. For example, as further depicted in FIGS. 6C and 6D, tables are indexed by fractional address values and each table entry includes 2-8 non-zero coefficients (filter taps $Tap_0$-$Tap_8$). The upper bound on taps is dependent on the size of the bounding region, which is 8×8 texels in the exemplary embodiment. The number of non-zero coefficient values corresponds to the number of contributing texels for that dimension. For example, referring to FIG. 6E, in the horizontal table 671, entries are traversed by $\beta_u$ to choose offset horizontal coefficients. The fractional address may be rounded to the nearest index value and depending on the implementation, various levels of precision may be supported for the fractional address indexing. For example, each table may have 32, 64, 128, or 256 entries, etc. The horizontal coefficients 621 of the corresponding table entry are then accessed. In the depicted example there are a maximum of 8 such coefficients corresponding to an 8 texel wide bounding region. The number of these coefficient values that are non-zero correspond to the number of texels defined by the footprint width w (i.e., number of contributing first filter taps). In the vertical table 672, entries are traversed by $\beta_v$ to choose properly offset vertical coefficients. The vertical coefficients 622 of the corresponding entry are then accessed. In the depicted example there are 8 such coefficients corresponding to an 8 texel tall bounding region. The number of these coefficient values that are non-zero correspond to the number of texels defined by the footprint height h (i.e., number of contributing second filter taps).

Continuing with description of method 601, using the above technique to properly offset horizontal and vertical coefficients, the coefficients are fetched from memory into the coefficient cache following the sequencing of the texel groupings of the minimum granularity that were generated at operation 420. In the exemplary embodiment where this minimum grouping is the texel quad containing 2×2 neighboring texels, four coefficients for each texel quad (e.g., the two horizontal coefficients 621 and the two vertical coefficients 622 and in FIG. 6B) are advantageously fetched from memory into one cache line. A number of such coefficient cache lines may be sequenced over the number of texel quads generated for the specified separable filter footprint (e.g., two cache lines for two texel quads, sixteen cache lines for sixteen quads, etc.). The separable filter equation above may then be implemented with the cached vertical and horizontal coefficient for each sub-sample address multiplied together to form a compound (2D) coefficient at operation 520. This is further illustrated for the exemplary 2×2 texel quad in FIG. 6B where horizontal coefficients $H_0$, $H_1$, are multiplied by vertical coefficients $V_0$ and $V_1$ to arrive at compound coefficients $HV_0$ and $HV_1$. Horizontal coefficients $H_2$ and $H_3$ are each similarly multiplied by vertical coefficients $V_2$ and $V_3$ to arrive at compound coefficients $HV_2$ and $HV_3$. At this point, method 601 can return to operation 450 in method 401 where the cached lines of filter coefficients are the compound coefficients output from method 601. Operations 450 and 460 of method 401 then proceed as further exemplified in FIG. 6B where the compound filter coefficients 623 are then multiplied with the texel color values $T_0$, $T_1$, $T_2$, and $T_3$ for the corresponding quad 515 of sub-sample addresses (which may be similarly stored in a single cache line). The resulting weighted texel color values are then accumulated over all sub-sample addresses sequenced for the separable footprint to arrive at the filtered color value output from the texture sampler at operation 470.

Multi-Mode Filter Logic Unit

Further description of a multi-mode filter logic unit configurable for a weighted averaging of texel colors in addition to bilinear filtering is now provided in the context of FIGS. 7A-10. Such multi-mode filter logic unit has flexibility to support the multiple sampler modes described above for weighted averaging over any particular filter footprint and also perform efficient bilinear interpolation, as needed. For the sake of clarity, configurable filter architectures and multi-mode filtering methods are described in the context of MM FL unit 132 depicted in FIG. 2. Although one or more of these features so described may be advantageously incorporated into MM FL unit 132, it is noted that one or more of these features may be incorporated into a graphics processing system in a number of alternative manners. As such, one or more features found in filter logic unit embodiments may be implemented without one or more of the features described above in the context of a multi-mode sampler. For example, one or more multi-mode filter logic embodiments do not require a flexible footprint mode, just as one or more multi-mode sampler supporting a flexible footprint does not require multi-mode filter logic. Nevertheless, embodiments incorporating a multi-mode sampler supporting a flexible footprint mode with a multi-mode filter logic unit have a synergy that will be clear to one of ordinary skill.

Figure 7A:
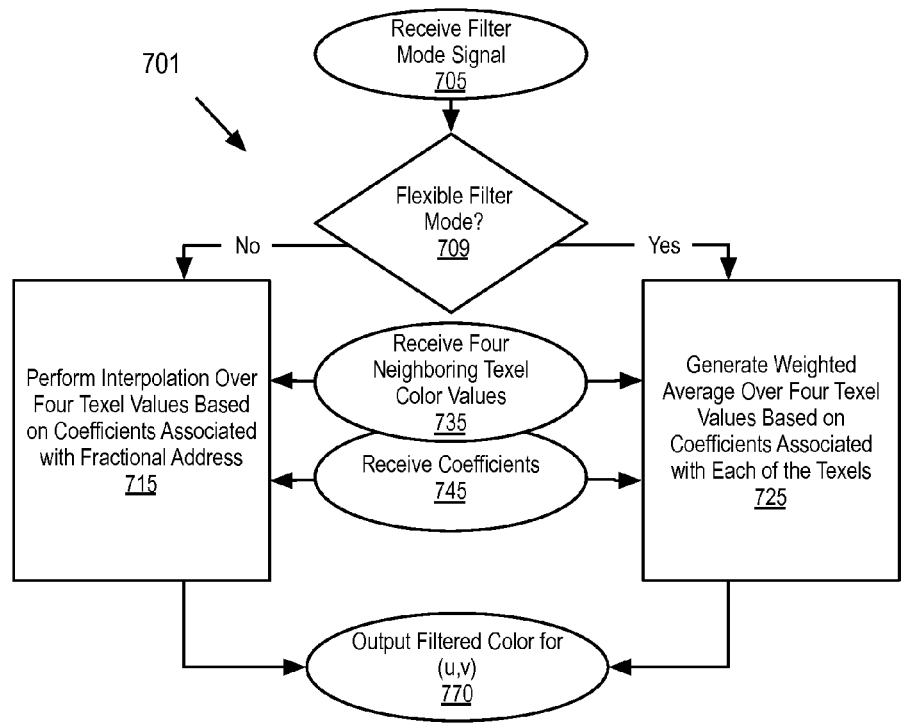
FIG. 7A is a flow diagram illustrating a multi-mode filtering method, in accordance with an embodiment.

In embodiments, a graphics processing system includes a configurable, or "flexible" texture filter suitable for implementing a multi-mode filtering method. FIG. 7A is a flow diagram illustrating a multi-mode filtering method 701, in accordance with an embodiment. Method 701 begins with receiving a filter mode signal at operation 705. The filter mode signal at least differentiates between a "bilinear filter" mode and a "flexible filter" mode. In the bilinear filter mode, texel data (e.g., color values) is weighted at operation 715 with a bilinear filter using the sub-texel (fractional) address to arrive at a filtered color output at operation 770. In the flexible filter mode, texel data is weighted at operation 725 based on predetermined texel weighting coefficient values that may or may not be dependent on the sub-texel (fractional) address. For example, in a non-separable filter mode as described above, the coefficients received at operation 745 in the flexible filter mode are independent of the fractional address while the coefficients have a sub-texel dependence in the separable filter mode.

In response to determining the mode signal is indicative of the bilinear filter mode at operation 709, method 701 proceeds to operation 715 where filter logic performs the bilinear interpolation (i.e., "bilerp") over four texel values received at operation 735. For the exemplary embodiment where a single 2×2 texel quad was sub-sampled based on the texture address (e.g., equivalent to quad 515-1 for footprint 520-1 in FIG. 5A), a single cache line read includes these four neighboring texel values. The bilerp is performed using coefficients that are indicative of the fractional texture address $\beta_u$ and $\beta_v$, which are received at operation 745.

In response to determining the mode signal is indicative of the flexible filter mode at operation 709, method 701 proceeds to operation 725 where the filter logic generates a weighted average over at least four texel values received at operation 735. For the exemplary embodiment where a number of 2×2 texel quads were sub-sampled as (u',v') based on the texture address and footprint (e.g., any of the footprints 520-1 through 520-8 depicted in FIG. 5A), a single cache line read may include the four neighboring texel values. The weighted average over one texel quad is generated using four predetermined weighting coefficients, each coefficient being indicative of a weighting associated with the corresponding texel in the quad. Upon arriving at the filtered color at operation 770, method 701 is complete and the weighted average color may be then returned to an accumulator (e.g., accumulator 298 in FIG. 2) for further averaging over a plurality of texel quads mapped to the filter footprint and/or returned to a shader core (e.g., EU 110 in FIG. 2) for subsequent output of a graphical object to a display screen.

Figure 7B:
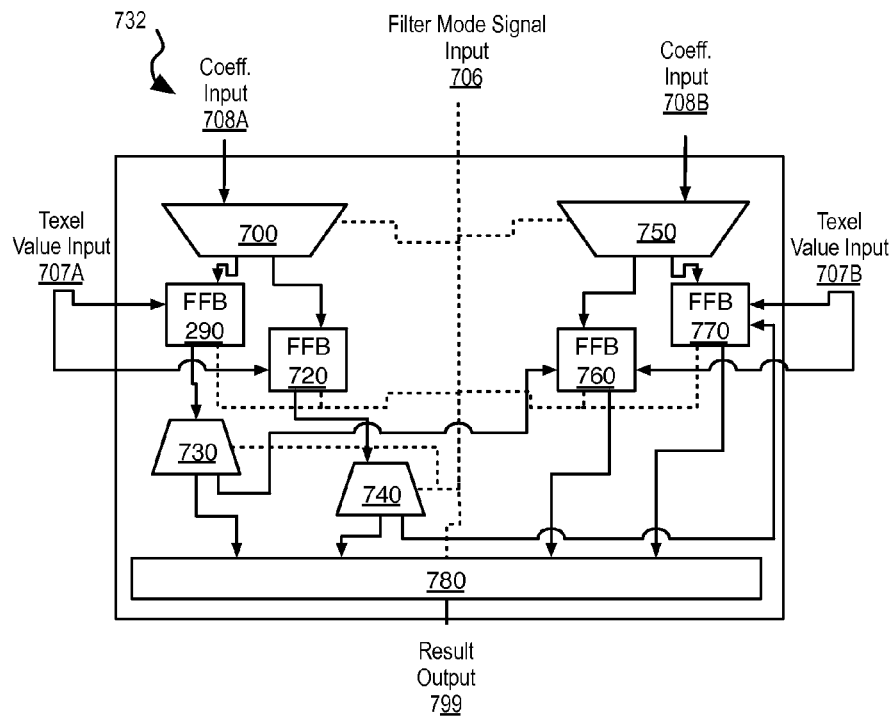
FIG. 7B is a block diagram of a filter logic unit configured to perform the multi-mode filtering method depicted in FIG. 7A, in accordance with embodiments.

FIG. 7B is a block diagram of a filter logic unit 732 configured to perform the multi-mode filtering method 701, in accordance with embodiments. In one advantageous embodiment, filter logic unit 732 is utilized as filter logic unit 132 depicted in FIG. 2. As shown, filter logic unit 732 is coupled to filter mode input line(s) 706. The filter logic unit 732 is further coupled to texel value input line(s) 707A and coefficient input line 708A. Although these input lines are illustrated as separate for the sake of clearly demarking the various system inputs, one or more of the input signal lines may be multiplexed in any conventional manner for conveyance of these various data signals into filter logic unit 732.

The logic circuitry of filter logic unit 732 further includes at least a pair of flexible filter blocks (FFB) that are coupled to the filter mode signal input 706 and operable in a plurality of modes selectable by the filter mode signal. In one exemplary embodiment, each FFB is configurable to perform a portion of the bilerp or similarly perform a portion of the flexible weighted averaging over a texel quad. As described further below, with circuitry of an FFB responsible for only a portion of a given one of the multiple filtering functions, each FFB may advantageously include the same circuitry and so represent a scalable filter logic block that is fully utilized regardless of the filtering mode. Such a microarchitecture design makes efficient use of chip area and reduces power consumption. In the exemplary microarchitecture, the filtering is apportioned between two FFB such that circuitry represented by a pair of FFB is operable in a first mode to perform the bilinear interpolation over the group of four neighboring texel values based on two input coefficients indicative of a fractional address associated with the four texels read in for a given input address. Similarly, circuitry represented by a pair of FFB is also operable in a second mode to generate the weighted average over the group of four neighboring texel values based on four coefficients, each indicative of a weighting associated with one of four texel values read in for a given filter footprint. Averaging over four texels may be then further accumulated over the footprint, for example by accumulator 298 in FIG. 2.

In the exemplary embodiment depicted in FIG. 7B, filter logic unit 732 includes four FFB, 290, 720, 760, and 770. Responsive to the filter mode signal, circuitry represented by FFB 290 and FFB 760 is operable in a first mode to perform the bilinear interpolation over a group of four neighboring texel values received at texel value input line 707A using coefficients received from coefficient input line 708A. Circuitry represented by the FFB 290 and 720 is operable in a second mode to generate the weighted average over the group of four neighboring texel values from input line 707A using coefficients received from input line 708A. In this exemplary embodiment, an FFB pair is staged in the bilinear filter mode with the bilerp serialized into a horizontal phase handled by one FFB and a vertical phase handled by the second FFB. In the flexible filter mode, FFB pairs are not so staged, but rather each FFB instead generates a weighted average over two of the four texels in parallel. The weighted average is then accumulated to arrive at a weighted average of one four texel quad. With this microarchitecture, multiplexer 700 distributes coefficients received on input line 708A to each of FFB 290 and 720. In the bilinear filter mode, the coefficients are associated with a first dimension of a fractional address (e.g., $\beta_u$). Multiplexer 750 similarly distributes coefficients associated with the second dimension of the fractional address (e.g., $\beta_v$) from coefficient input line 708B. Coefficients based on $\beta_v$ are output to FFB 760 for use in the second phase of the staged bilerp filtering.

In embodiments, a selector is coupled between a pair of filter logic blocks to selectively stage two flexible filter blocks. The selector may either pass output from an upstream filter block to a downstream filter block, or to an output stage responsible for further processing, such as accumulation. In the exemplary embodiment depicted in FIG. 7B, output from FFB 290 is passed to selector 730. Selector 730 is further coupled to filter mode signal input 706 and, in response to a bilinear filter mode signal, passes output from FFB 290 to an input of FFB 760. Similarly, output from FFB 720 is coupled to selector 740, which like selector 730, is further coupled to filter mode signal input 706. In response to a bilinear filter mode signal, selector 740 passes output from FFB 720 to an input of FFB 770. FFB 760 is coupled to output stage 780 and outputs a result of the second phase of the staged bilerp filtering based the $\beta_u$ coefficient received from multiplexer 750 for a first texel quad. FFB 770 similarly provides to output stage 780 results of the second phase of the staged bilerp filtering with the $\beta_v$ coefficient received from multiplexer 750 for a second texel quad.

Alternatively, in response to a flexible filter mode signal, selectors 730, 740 pass output from FFB 290, 720, respectively, to output stage 780. Likewise, in response to a flexible filter mode signal, FFB 760 and 770 receive texel values for a second texel quad through texel value input line 707B, which are processed using weighting coefficients received from coefficient signal input line 708B, and passed to output stage 780. Output stage 780 is further coupled to filter mode signal input line 706. Responsive to the filter mode signal, output stage 780 may pass signals received from selector 730, and/or 740, and/or FFB 720, and/or FFB 760, and/or FFB 770, accumulate any of these received signals, and/or normalize one or more these received signals, and/or interpolate between a plurality of these received signals. Output stage 780 is further coupled to output signal line 799 over which the result from flexible filter logic unit 732 is conveyed to an external destination.

With the multi-mode filtering method and architecture of flexible filter logic unit 732 as described above, aspects of the method and architecture are described below in further detail in the context of the bilinear filter mode in FIGS. 8A, 8B and, 8C, and in the context of the flexible filter mode in FIGS. 9A, 9B.

Figure 8A:
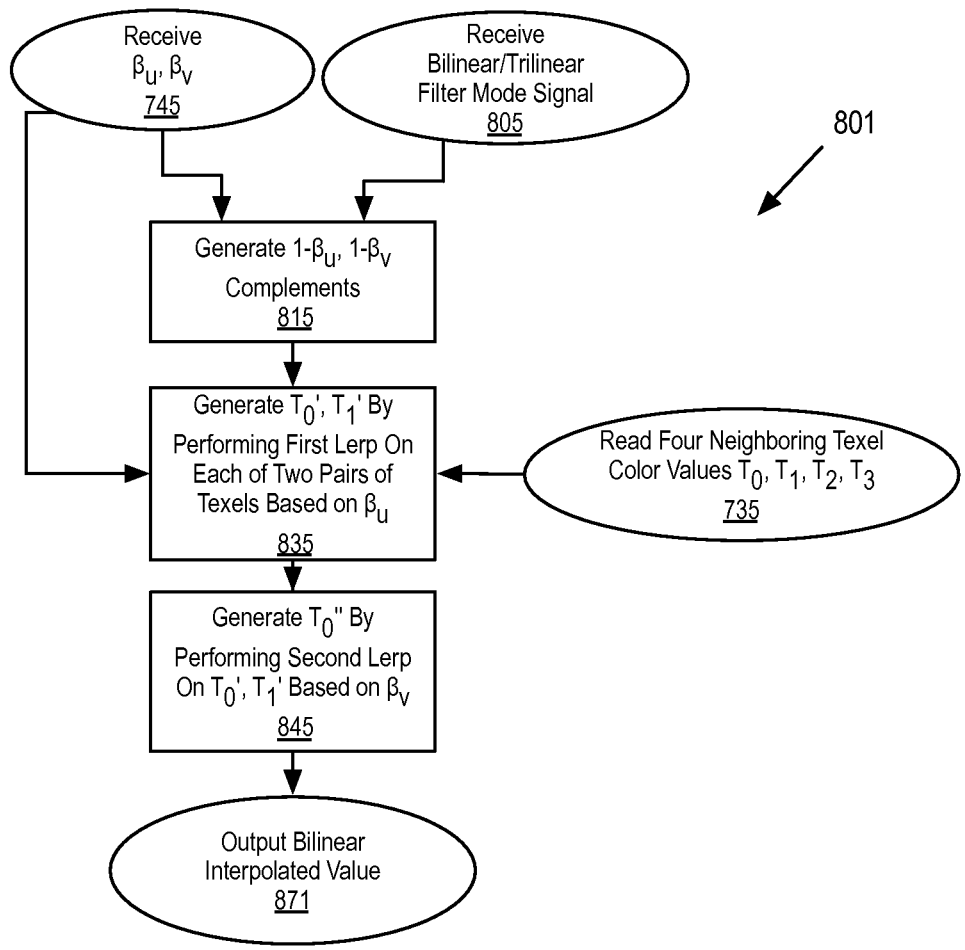
FIG. 8A is a flow diagram illustrating a bilinear filtering method that may be performed as part of the multi-mode filtering method depicted in FIG. 7A, in accordance with embodiments.

FIG. 8A is a flow diagram illustrating a bilinear filtering method 801 that may be performed as part of the multi-mode filtering method 701 depicted in FIG. 7A, in accordance with embodiments. Method 801 begins with receiving a bilinear filter mode signal at operation 805. Such a signal may further be utilized for a trilinear filter mode where the bilinear mode operations are followed with an additional interpolation stage between texels associated with different levels of detail (LOD). In method 801, the coefficients received as inputs at operation 745 are the $\beta_u$ and $\beta_v$ values associated with a predetermined fractional address. At operation 815, complements of the coefficients ($1-\beta_u$ and $1-\beta_v$) are generated. A first lerp (e.g., horizontal) is performed to generate a pair of linear interpolated values $T_0'$, $T_1'$ at operation 835. $T_0'$, $T_1'$ are generated from one dimension of the fractional address and four texel values (e.g., colors) $T_0$, $T_1$, $T_2$, and $T_3$ for the nearest neighboring texel quad associated with the texture address read in from memory (e.g., in one cache line) at operation 735. A first linear interpolated value, $T_0'$ is generated for a first pair of the texels by multiplying a first texel value of the first pair with a first coefficient corresponding to the fractional address. A second texel of the first pair is multiplied with the complement of the first coefficient. A second linear interpolated value $T_1'$ is generated for a second pair of the texels by multiplying the first coefficient with a third texel value associated with the second pair. A fourth texel value associated with the second pair is multiplied with the complement of the first coefficient. These scaled values are then summed. In the exemplary embodiment, the interpolated values $T_0'$, $T_1'$ are generated, one for each of two pairs based on $\beta_u$, by implementing the functions:

$$T_0' = \beta_u T_0 + (1-\beta_u)T_1;$$

$$T_1' = \beta_u T_2 + (1-\beta_u)T_3.$$

Alternatively, an interpolation may be performed at operation 835 based on $\beta_v$ and the texel value pairs $T_0$, $T_2$. and $T_1$, $T_3$. Method 801 then proceeds to operation 845 where a second lerp is performed to generate a bilinear interpolated value $T_0''$, for the example above further implementing the function:

$$T_0'' = \beta_v T_0' + (1-\beta_v)T_1'.$$

Method 801 then completes with output of the bilinear interpolated value $T_0''$ as the filtered result.

Figure 8B:
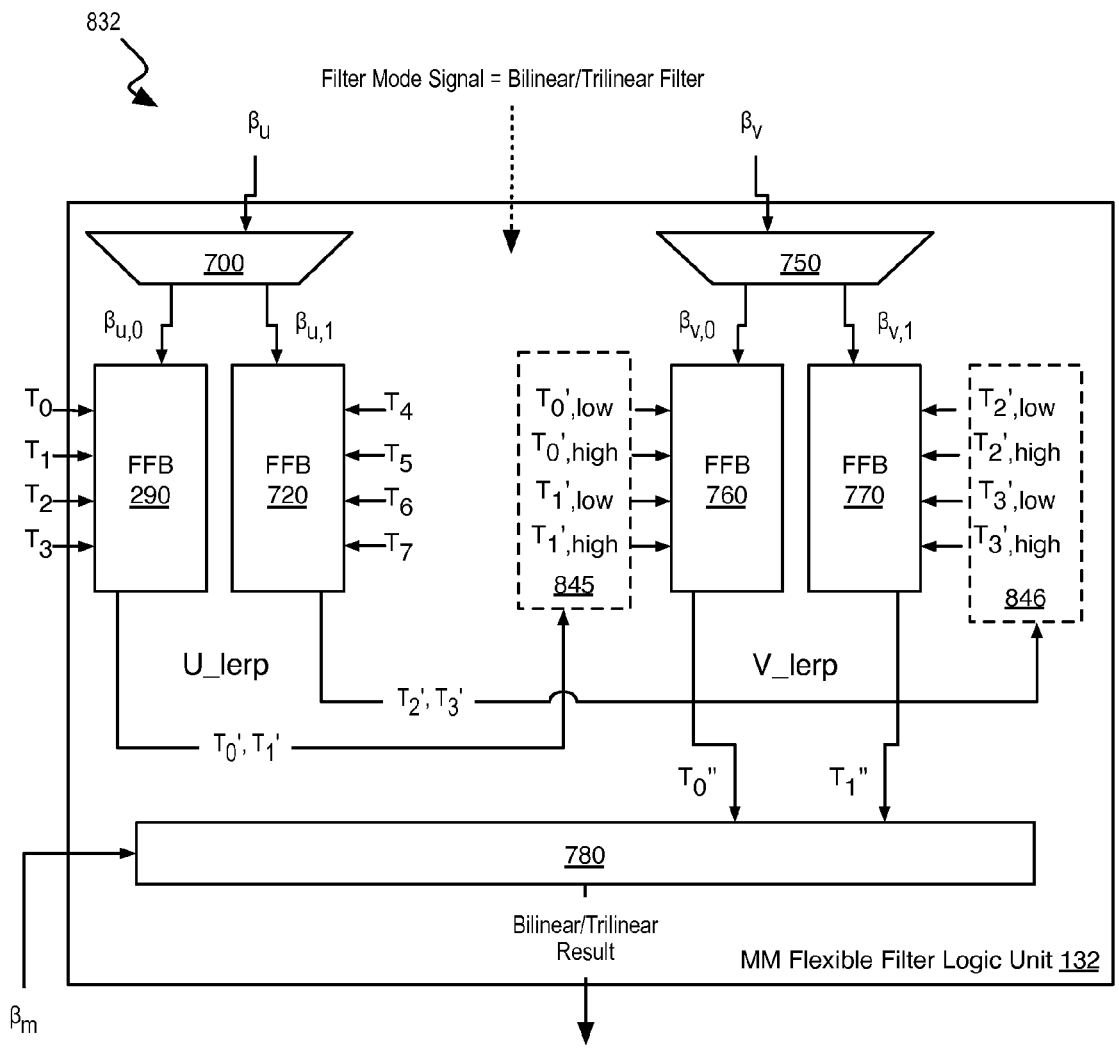
FIG. 8B is a block diagram of a filter logic unit configured into a bilinear filter mode, in accordance with embodiments.

FIG. 8B depicts a block diagram of a filter logic unit 832 configured into a bilinear filter mode, in accordance with embodiments. In the exemplary embodiment, filter unit 832 is filter logic unit 732 of FIG. 7B in a state associated with a filter mode signal indicative of a bilinear and/or trilinear filter mode. Reference numbers introduced in FIG. 7B are retained in FIG. 8B for the sake of clarity. In alternative embodiments however, filter logic unit 832 may not include all components depicted in filter logic unit 732.

In the exemplary embodiment depicted in FIG. 8B, each flexible filter block 290, 720, 760 and 770 is to generate a pair of linear interpolated values from four texel values and one dimension of a fractional address. Multiplexer 700 is communicatively coupled to a coefficient memory storing an input texture address (u,v). A coefficient associated with one texture address is read in and output as $\beta_{u,0}$ to FFB 290. FFB 290 is communicatively coupled to a texel memory, such as texel cache 215 in FIG. 2, and reads in texel values $T_0, T_1, T_2$, and $T_3$ for a nearest neighboring texel quad associated with a first texture address. FFB 290 performs the first lerp (e.g., horizontal) to generate the pair of linear interpolated values $T_0'$ and $T_1'$. FFB 720 is communicatively coupled to the texel memory, and reads in texel values $T_4, T_5, T_6$, and $T_7$ for the nearest neighboring texel quad associated with a second texture address. FFB 720 performs another first lerp to generate another pair of linear interpolated values $T_2', T_3'$ for example by applying the equations above to the second texel quad.

FFB 290 is communicatively coupled to FFB 760 (e.g., by selector 730 shown in FIG. 7B) with FFB 720 similarly coupled to FFB 770. In the exemplary embodiment, the second lerp performed by FFB 760 (FFB 770) is performed on interpolated values $T_0'$ and $T_1'$ ($T_2', T_3'$) that are split into high and low bit portions (e.g., $T_{0,high}', T_{1,high}'$ and $T_{0,low}', T_{1,low}'$ or $T_{2,high}', T_{3,high}'$ and $T_{2,low}', T_{3,low}'$). Splitting the interpolated values from the first lerp phase is advantageous for at least the reason that FFB 290, 720, 760, and 770 may then all utilize logic of the same bit-width (e.g. 8-bit) and the number of texel value inputs is the same, permitting the same microarchitecture within each FFB. Where 8-bit logic is employed in the FFB 290 and 760, each texel value $T_0, T_1, T_2, T_3$ and $\beta_{u,0}$ has an 8-bit representation and the interpolated values $T_0'$ and $T_1'$ have 16-bit representations, and likewise for $T_2', T_3'$. Convertor 845 converts the wide-bit lerp values into high bit portions ($T_{0,high}', T_{1,high}'$) and low bit portions ($T_{0,low}', T_{1,low}'$), each of these being, for example, 8-bit representations. Output of convertor 845 is communicatively coupled to input of FFB 760. This architecture is replicated with convertor 846 and FFB 770. FFB 760 and 770 are also communicatively coupled to multiplexer 700, which is further communicatively coupled to a coefficient memory from which a second coefficient associated with a texture address is read in and output as $\beta_{v,0}$ to FFB 760. Similarly coefficient $\beta_{v,1}$ is output to FFB 770. FFB 760, 700 are then to perform a second lerp (e.g., vertical lerp) to generate the bilinear interpolated value $T_0''$ and $T_1''$, respectively. Output stage 780 may either output the bilinear interpolated values $T_0''$ and $T_1''$ as bilinear filtered results, or in response to a trilinear mode signal, perform a further interpolation between $T_0''$ and $T_1''$ based on a coefficient $\beta_m$, for example using any conventional technique for scaling bilerp values between two LOD.

Figure 8C:
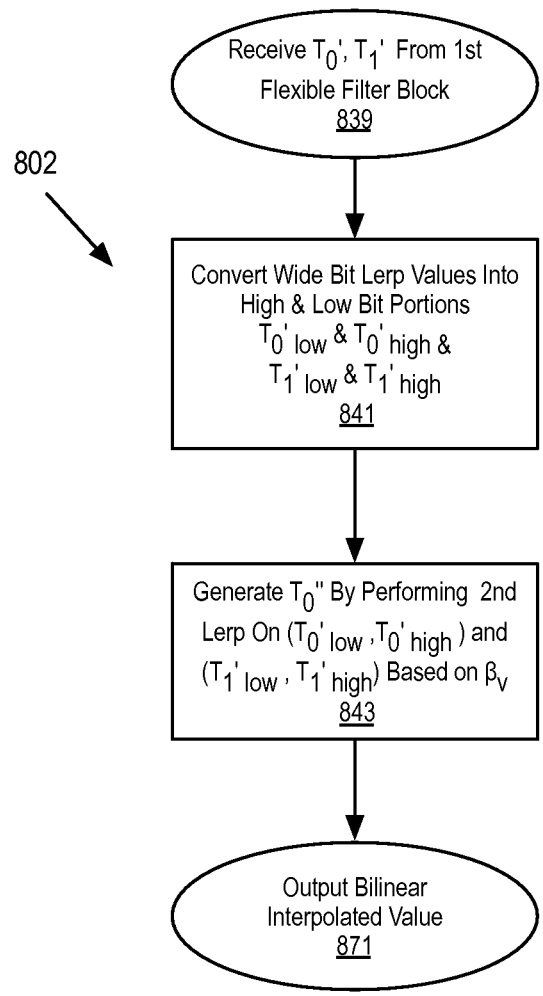
FIG. 8C is a flow diagram illustrating the bilinear filtering method depicted in FIG. 8A as more specifically performed by the filter logic unit depicted in FIG. 8B, in accordance with embodiments.

FIG. 8C further illustrates the second lerp method 802 performed by the filter logic unit 832. The second pair of FFB stages, 720, 770 may perform this same method. Method 802 begins with receiving $T_0', T_1'$ from the first FFB at operation 839. The received wide-bit lerp values are then converted into the high and low bit portions at operation 841. At operation 843, the bilinear interpolated value $T_0''$ is generated with the full bit width (e.g., 16-bit) by assembling a third linear interpolated value (generated based on $\beta_{v,0}$ and the low bit portions $T_{0,low}', T_{1,low}'$), and a fourth linear interpolated value (generated based on $\beta_{v,0}$ and the high bit portions $T_{0,high}', T_{1,high}'$. Expanding the second lerp equation above for example, $T_0''$ may be generated at operation 843 by implementing the function:

$$T_0'' = \beta_v T_{0,low}' + (1 - \beta_{v,0})T_{1,low}' + (\beta_{v,0} T_{0,high}' + (1 - \beta_{v,0})T_{1,high}') * 256,$$

where the multiplier 256 shifts the high bits left by eight positions (a carry bit may also be utilized, etc.). Method 802 then completes at operation 871 with output of the bilinear interpolated value $T_0''$.

Figure 9A:
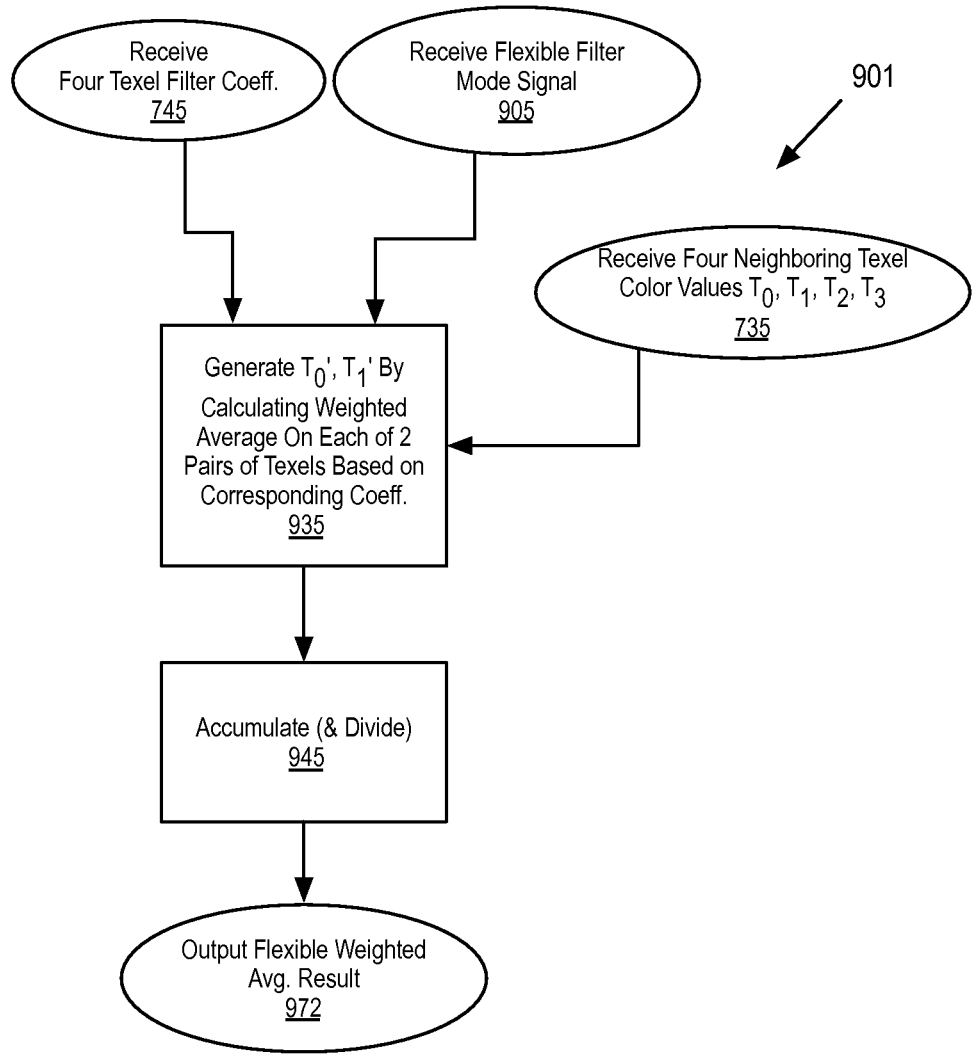
FIG. 9A is a flow diagram illustrating a flexible filtering method that may be performed as part of the multi-mode filtering method depicted in FIG. 7A, in accordance with embodiments.

FIG. 9A is a flow diagram illustrating a flexible filtering method that may be performed as part of the multi-mode filtering method depicted in FIG. 7A, in accordance with embodiments. Method 901 begins with receiving a flexible filter mode signal at operation 905. In method 901, the coefficients received as inputs at operation 745 are each indicative of the weighting associated with one of the four texel values $T_0, T_1, T_2, T_3$ received at operation 735. At operation 935 a first of the texel values is scaled by a first coefficient to generate a weighted value that is added to a second of the texel values scaled by a second coefficient, for example following the equation:

$$T_0' = w_0 T_0 + w_2 T_2.$$

Third and fourth texel values are similarly weighted following the equation:

$$T_1' = w_1 T_1 + w_3 T_3.$$

At operation 945, these weighted texel pairs are then accumulated (summed) at operation 945 to arrive at a weighted average for one texel quad. In further embodiments, the accumulated value may be divided by a normalization factor. The method 901 then completes at operation 972 with output of the flexible weighted average, for example to the accumulator 298 in FIG. 2.

Figure 9B:
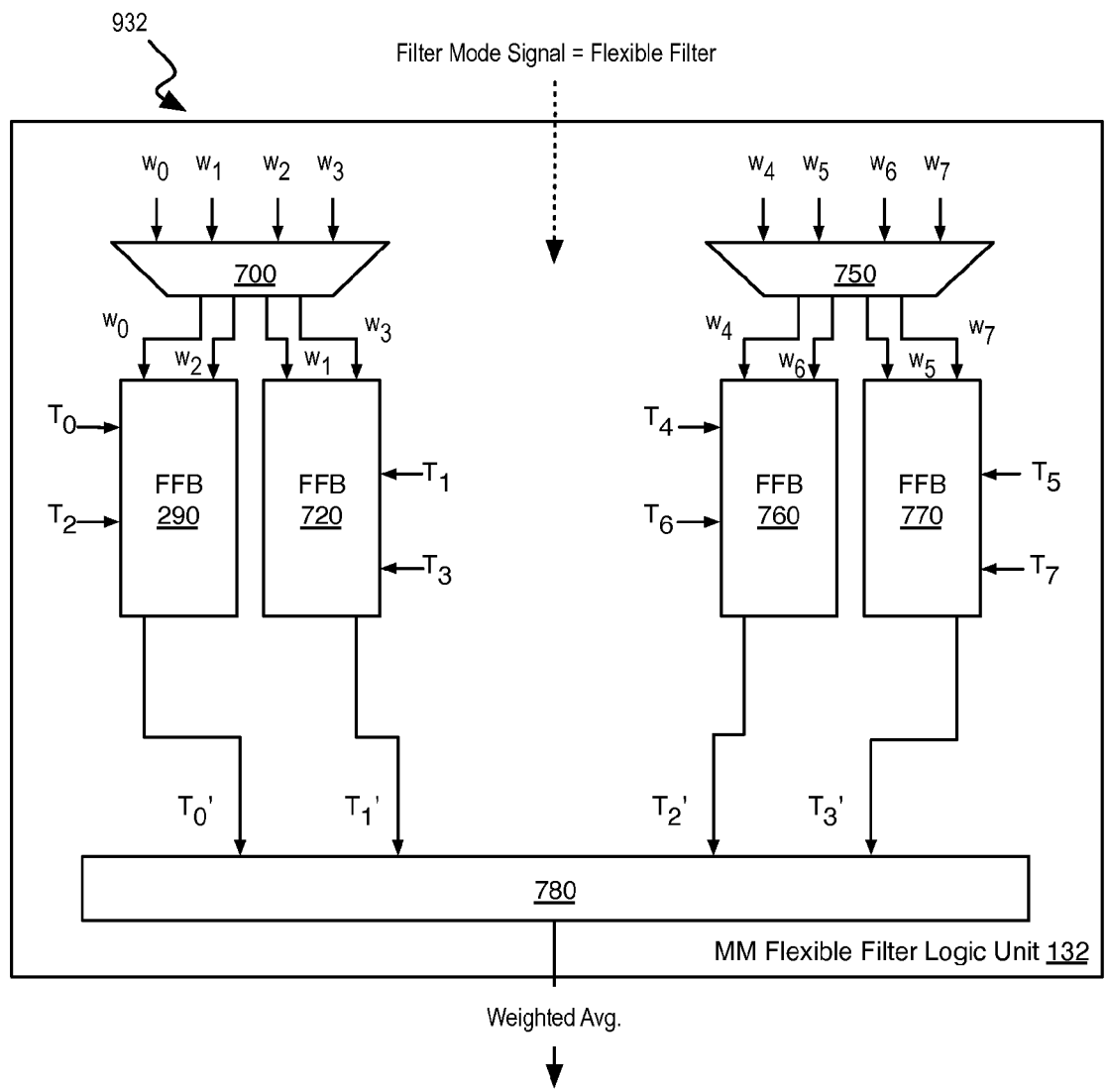
FIG. 9B is a block diagram of a filter logic unit configured into a flexible filter mode, in accordance with embodiments.

FIG. 9B is a block diagram of a filter logic unit configured into a flexible filter mode, in accordance with embodiments. In the exemplary embodiment, filter unit 932 is filter logic unit 732 of FIG. 7B in a state associated with a filter mode signal indicative of a flexible filter mode. Reference numbers introduced in FIG. 7B are retained in FIG. 9B for the sake of clarity. In alternative embodiments however, filter logic unit 932 may not include all of the components present in filter logic unit 732.

In the exemplary embodiment depicted in FIG. 9B, each flexible filter block 290, 720, 760 and 770 is to generate a sum of a first and second of the texel values with the first texel value scaled by a first coefficient, and the second texel value scaled by a second coefficient. Multiplexer 700 is communicatively coupled to a coefficient memory, such as a coefficient cache, from which four coefficients $w_0, w_1, w_2$, and $w_3$ associated with one texture address is read in with $w_0$ $w_2$ output to FFB 290 and $w_1, w_3$ output to FFB 720. FFB 290 is communicatively coupled to a texel memory, such as texel cache 215 in FIG. 2, and receives texel values $T_0$ and $T_2$ for the nearest neighboring texel quad associated with a first texture address. FFB 720 is similarly coupled to receive texel values $T_1$ and $T_3$ for the first texture address. Implementing the flexible weighting function above, FFB 290 generates $T_0'$ as the sum of a first texel value $T_0$ scaled by a first coefficient $w_0$ and a second texel value $T_2$ scaled by a second coefficient $w_2$. FFB 720 likewise generates $T_1'$ as the sum of a first texel value $T_1$ scaled by a first coefficient $w_1$ and a second texel value $T_3$ scaled by a second coefficient $w_3$. FFB 290 and 720 are communicatively coupled to output stage 780. Output stage 780 then operates as an accumulator to add the sums $T_0'$ and $T_1'$ which are output from filter logic 932 as a weighted sum for one texel quad to the one or more output signal line. FFB 760 and 770 may similarly output weighted sums $T_2'$ and $T_3'$ for another texel quad, which may be further accumulated with the sum of $T_0'$ and $T_1'$ in output stage 780.

Figure 10A:
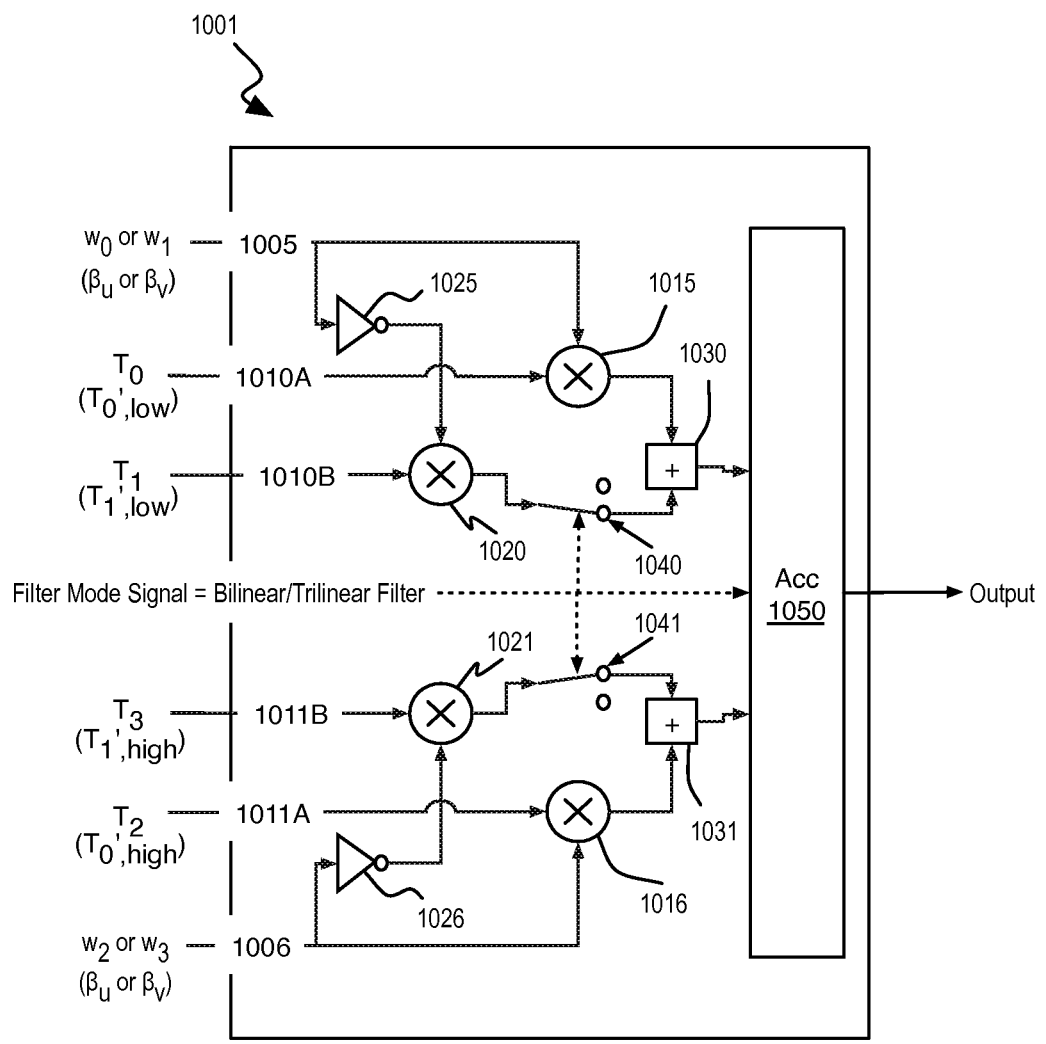
FIG. 10A is a block diagram of a flexible filter block configured into a bilinear filter mode, in accordance with embodiments.
Figure 10B:
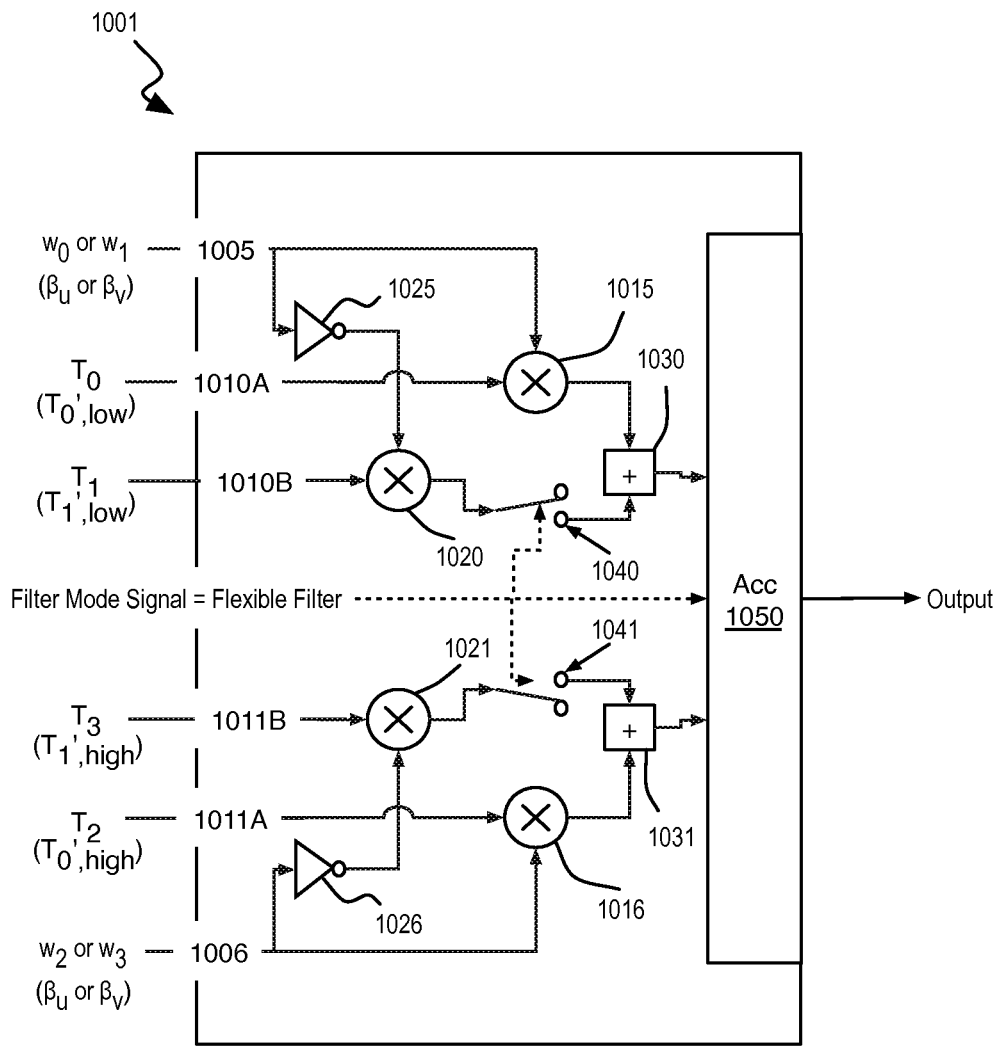
FIG. 10B is a block diagram of the flexible filter block in FIG. 9B configured in a flexible filter mode, in accordance with embodiments.

With the multi-mode operation of the plurality of flexible filter blocks described above, a more detailed description of the microarchitecture of one flexible filter block is described below in the context of FIGS. 10A-10B. FIG. 10A is a block diagram of a flexible filter block in a filter logic unit configured into a bilinear filter mode, in accordance with embodiments. FIG. 10B is a block diagram of the flexible filter block of FIG. 10A configured in a flexible filter mode, in accordance with embodiments.

Referring first to FIG. 10A, flexible filter block (FFB) 1001 illustrates an exemplary microarchitecture in one embodiment that is utilized by each FFB illustrated in any of the filter logic units depicted in FIG. 7B, 8B, or 9B. In other embodiments, however, flexible filter block 1001 may be incorporated into alternatively designed filter logic units. FFB 1001 illustrates circuitry in a state associated with a filter mode signal indicative of a bilinear (trilinear) filter mode. FFB 1001 includes a coefficient input 1005 to receive a coefficient associated with either a predetermined fractional address (e.g., $\beta_u$ or $\beta_v$) or a predetermined texel weighting coefficient (e.g., $w_0$ or $w_1$). In the bilinear filter mode, this coefficient is $\beta_u$, for example. FFB 1001 further includes two texel value inputs 1010A, 1010B, each to receive a texel color value. A first multiplier 1015 has a first input coupled to the coefficient input 1005 and a second input coupled to texel value input 1010A. A second multiplier 1020 has a first input coupled to the first coefficient input 1005 through an invertor 1025 and a second input coupled to the second texel value input 1010B. An adder 1030 is coupled to an output of first multiplier 1015 and an output of second multiplier 1020. The coupling between multiplier 1020 and adder 1030 is through a switch 1040 that is responsive to the filter mode signal. In the bilinear mode, switch 1040 is closed to pass a texel value (e.g., $T_1$) as scaled by the complement of $\beta_u$ or $\beta_v$, which is added to the product of another texel value (e.g., $T_0$) as scaled by $\beta_u$ or $\beta_v$, to generate the first interpolated value (e.g., $T_0'$). This logic is replicated within the filter block 1001 by inputs 1006, 1011A, and 1011B, multipliers 1016, 1021, invertor 1026, adder 1031, and switch 1041 to generate the second interpolated value (e.g., $T_1'$), thereby implementing one phase of a bilinear interpolation.

Coupled to output the adders 1030 and 1031 is accumulator 1050, which is further coupled to the filter mode signal and is to either add together or pass the outputs of the adders based on the filter mode signal and whether the first or second lerp phase is being performed. For example, when in the bilinear mode, but performing a first lerp phase, accumulator 1050 is to pass the data received from adders 1030 and 1031 (e.g., as $T_0'$ and $T_1'$). When in the bilinear mode, but performing a second lerp phase, accumulator 1050 performs the shifted addition of the data received from adders 1030 and 1031 to assemble the bilinear interpolated value $T_0''$.

In FIG. 10B, FFB 1001 is in a second state in response to a filter mode signal indicative of a flexible filter mode. In this state, switches 1040 and 1040 are open and coefficients received at inputs 1005 and 1006 are each multiplied by texel values received at inputs 1010A and 1011A, respectively. These scaled values pass through to accumulator 1050. In the flexible filter mode, accumulator 1050 is to sum the received values and output a weighted average of two texels as described elsewhere herein.

Figure 11:
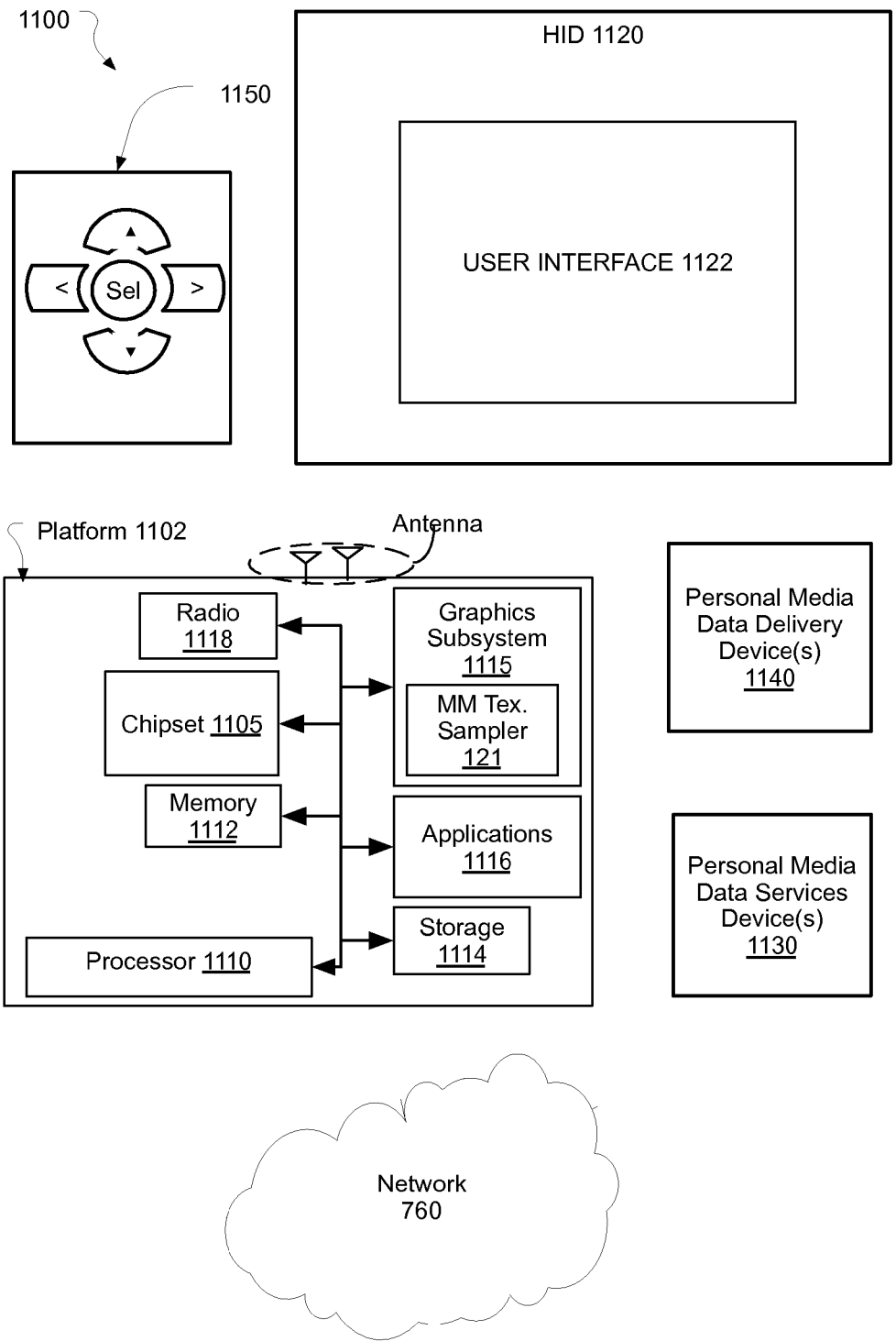
FIG. 11 is an illustrative diagram of an exemplary system, in accordance with embodiments.

FIG. 11 is an illustrative diagram of an exemplary system 1100, in accordance with embodiments. System 1100 may implement all or a subset of the various functional blocks depicted in FIG. 2. For example, in one embodiment the MM texture sampler 121 is included in the system 1100. System 1100 may be a mobile device although system 1100 is not limited to this context. For example, system 1100 may be incorporated into a laptop computer, ultra-laptop computer, tablet, touch pad, portable computer, handheld computer, palmtop computer, cellular telephone, smart device (e.g., smart phone, smart tablet or mobile television), mobile internet device (MID), messaging device, data communication device, and so forth. System 1100 may also be an infrastructure device. For example, system 1100 may be incorporated into a large format television, set-top box, desktop computer, or other home or commercial network device.

In various implementations, system 1100 includes a platform 1102 coupled to a HID 1120. Platform 1102 may receive captured personal media data from a personal media data services device(s) 1130, a personal media data delivery device(s) 1140, or other similar content source. A navigation controller 1150 including one or more navigation features may be used to interact with, for example, platform 1102 and/or HID 1120. Each of these components is described in greater detail below.

In various implementations, platform 1102 may include any combination of a chipset 1105, processor 1110, memory 1112, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1110 may be a multi-core processor(s), multi-core mobile processor(s), and so forth. In one exemplary embodiment, processor 1110 invokes or otherwise implements processes and/or methods of the CMMS 1101 and the various modules described in as components of CMMS 1101 elsewhere herein.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video media data for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, Display Port, wireless HDMI, and/or wireless HD compliant techniques. Graphics subsystem 1115 may be integrated into processor 1110 or chipset 1105. In some implementations, graphics subsystem 1115 may be a stand-alone card communicatively coupled to chipset 1105.

The texture sampler features and related texture sampling and filtering techniques described herein may be implemented in various hardware architectures. For example, graphics and/or video functionality may be integrated within a chipset. Alternatively, a discrete graphics and/or video processor may be used. As still another embodiment, the methods and functions described herein may be provided by a general purpose processor, including a multi-core processor.

In further embodiments, the methods and functions may be implemented in a purpose-built consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, HID 1120 may include any television type monitor or display. HID 1120 may include, for example, a computer display screen, touch screen display, video monitor, television-like device, and/or a television. HID 1120 may be digital and/or analog. In various implementations, HID 720 may be a holographic display. Also, HID 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on HID 1120.

In various implementations, personal media services device(s) 1130 may be hosted by any national, international and/or independent service and thus accessible to platform 1102 via the Internet, for example. Personal media services device(s) 1130 may be coupled to platform 1102 and/or to display 1120. Platform 1102 and/or personal services device(s) 1130 may be coupled to a network 1160 to communicate (e.g., send and/or receive) media information to and from network 1160. Personal media delivery device(s) 1140 also may be coupled to platform 1102 and/or to HID 1120.

In various implementations, personal media data services device(s) 730 may include a cable television box, personal computer, network, telephone, Internet enabled devices or appliance capable of delivering digital information and/or content, and any other similar device capable of unidirectionally or bidirectionally communicating content between a media data provider and platform 1102, via network 1160 or directly. It will be appreciated that the content may be communicated unidirectionally and/or bidirectionally to and from any one of the components in system 1100 and a provider via network 1160. Examples of personal media include any captured media information including, for example, video, music, medical and gaming information, and so forth.

Personal media data services device(s) 1130 may receive content including media information with examples of content providers including any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., HID 720) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In embodiments, controller 1150 may not be a separate component but may be integrated into platform 1102 and/or HID 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other personal media services device(s) 1130 or personal media delivery device(s) 1140 even when the platform is turned "off." In addition, chipset 1105 may include hardware and/or software support for 8.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 1100 may be integrated. For example, platform 1102 and personal media data services device(s) 1130 may be integrated, or platform 1102 and captured media data delivery device(s) 1140 may be integrated, or platform 1102, personal media services device(s) 1130, and personal media delivery device(s) 1140 may be integrated, for example. In various embodiments, platform 1102 and HID 1120 may be an integrated unit. HID 1120 and content service device(s) 1130 may be integrated, or HID 1120 and personal media delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
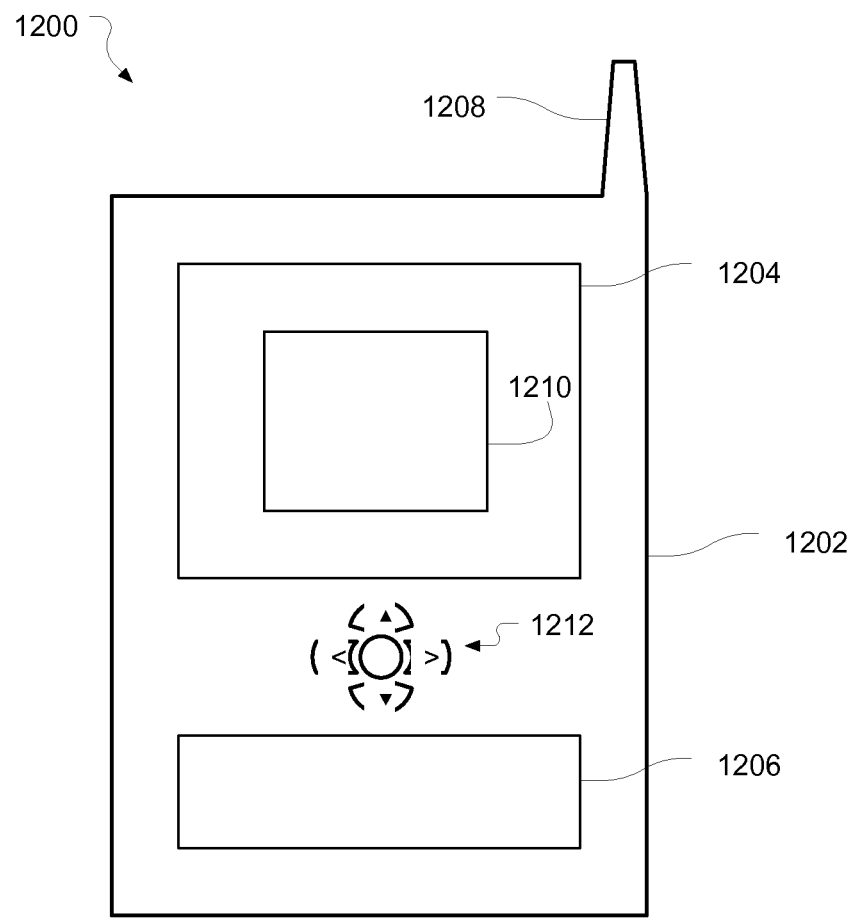
FIG. 12 is an illustrative diagram of an exemplary system, arranged in accordance with an embodiment.

As described above, system 1100 may be embodied in varying physical styles or form factors. FIG. 12 illustrates embodiments of a small form factor device 1300 in which system 1100 may be embodied. In embodiments, for example, device 1300 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers configured to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing 1202, a display 1204, an input/output (I/O) device 1106, and an antenna 1208. Device 1200 also may include navigation features 1212. Display 1204 may include any suitable display unit for displaying information appropriate for a mobile computing device. I/O device 1206 may include any suitable I/O device for entering information into a mobile computing device. Examples for I/O device 1206 may include an alphanumeric keyboard, a numeric keypad, a touch pad, input keys, buttons, switches, rocker switches, microphones, speakers, voice recognition device and software, and so forth. Information also may be entered into device 800 by way of microphone (not shown). Such information may be digitized by a voice recognition device (not shown). The embodiments are not limited in this context.

Various embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: programs, applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Instructions representing various logic within the processor, which when read by a machine may also cause the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to particular exemplary embodiments.

In one or more first embodiment, a graphics processing system with a multi-mode texture filter comprises one or more signal input to receive a plurality of texel values and a filter mode signal and logic circuitry communicatively coupled to the one or more signal input. The logic circuitry is operable in a plurality of modes selectable by the filter mode signal. The logic circuitry in a first mode perform bilinear interpolation over a group of neighboring texel values based on coefficients indicative of a fractional texture address, and the logic circuitry in a second mode to perform a weighted averaging over the group of neighboring texel values based on the coefficients, wherein each of the coefficients is indicative of a weighting associated with one of the multiple texel values. The system further includes one or more output signal line communicatively coupled to the logic circuitry to output the filtered texture data.

In furtherance of the one or more first embodiment, the logic circuitry further comprises a plurality of filter blocks. Each filter block in the first mode is to generate a pair of linear interpolated values from four texel values and one dimension of the fractional address. Each filter block in the second mode is to sum a pair of the four texel values with a first of the pairs scaled by a first of the coefficients, and a second of the pair scaled by a second of the coefficients.

In furtherance of the one or more first embodiment, the logic circuitry further comprises a first filter block to generate, in the first mode, a first pair of linear interpolated values from four texel values and a first dimension of the fractional address, and to generate, in the second mode, a sum of a pair of texel values with a first of the pair scaled by a first coefficient, and a second of pair scaled by a second coefficient. The logic circuitry further comprises a second filter block to generate, in the first mode, a second pair of linear interpolated values from the four texels and a second dimension of the fractional address, and to generate, in the second mode, a sum of a second pair of the texel values scaled by corresponding coefficients. The logic circuitry further comprises an accumulator to output, in the first mode, a sum of the second interpolated values to the one or more output signal line, and to output, in the second mode, the weighted average over the group of four texel values to the one or more output signal line.

In furtherance of the one or more first embodiment, the logic circuitry further includes a first filter block to generate, in the first mode, a first pair of linear interpolated values from the four texel values and a first dimension of the fractional address. The logic circuitry further includes a converter coupled to an output of first filter stage in the first mode, the converter to convert each of the first pair of linear interpolated values having a full bit width into a high bit portion and a low bit portion. The logic circuitry further includes a second filter block to generate, in the first mode, a third linear interpolated value based on a second dimension of the fractional address and the low bit portions of the first pair of linear interpolated values. The second filter block is further to generate, in the first mode, a fourth linear interpolated value based on the second dimension of the fractional address and the high bit portions of the first pair of linear interpolated values. The second filter block is further to assemble the third and fourth linear interpolated values into a bilinear interpolated value having the full bit width, and output the bilinear interpolated value to the one or more output signal line.

In furtherance of the one or more first embodiment, the logic circuitry further includes a first filter block to generate, in the first mode, a first linear interpolated value for a first pair of the texels by multiplying a first texel value associated with the first texel pair with a first coefficient corresponding to the fractional address, multiplying a second texel associated with the first texel pair with the complement of the first coefficient, and summing the results. The first filter block is to generate, in the first mode a second linear interpolated value for a second pair of the texels by multiplying a third texel value associated with the second texel pair with the first coefficient multiplying a fourth texel value associated with the second texel pair with the complement of the first coefficient. The circuitry further includes a converter coupled to an output of first filter stage in the first mode, the converter to convert each of the first and second linear interpolated values having a full bit width into a high bit portion and a low bit portion. The circuitry further includes a second filter block to generate, in the first mode, a third linear interpolated value by multiplying a low bit portion of the first linear interpolated value with a second coefficient corresponding to the fractional address, multiplying a low bit portion of the second linear interpolated value with the complement of second coefficient, and summing the results. The second filter block to generate, in the first mode, a fourth linear interpolated value by multiplying a high bit portion of the first linear interpolated value with the second coefficient, multiplying a high bit portion of the second linear interpolated value with the complement of second coefficient; and summing the results. The second filter block is further to assemble the third and fourth linear interpolated values into a bilinear interpolated value having the full bit width, and output the bilinear interpolated value to the one or more output signal line.

In furtherance of the one or more first embodiment, the logic circuitry further includes a first filter block to generate, in the second mode, a sum of a first and second of the texel values, the first texel value scaled by a first coefficient, and the second texel value scaled by a second coefficient. The logic circuitry further includes a second filter block to generate, in the second mode, a sum of a third and fourth of the texel values, the third texel value scaled by a third coefficient, and the fourth texel value scaled by a fourth coefficient. The logic circuitry further includes an accumulator to add the sums and outputting the resulting weighted sum to the one or more output signal line.

In furtherance of the one or more first embodiment, the logic circuitry further includes four filter blocks, each filter block having the same logic circuitry, and is operable in a plurality of modes selectable by the filter mode signal. The four filter blocks are to output, in the first mode, a bilinear interpolation for two texel groups, each group comprising four neighboring texel values, based on a received fractional address in the first mode. The four filter blocks are to output, in the second mode, weighted average over two texel groups.

In furtherance of the one or more first embodiment, the logic circuitry further includes four filter blocks, each filter block having the same logic circuitry, and is operable in a plurality of modes selectable by the filter mode signal. The four filter blocks are to output, in the first mode, a bilinear interpolation for two texel groups, each group comprising four neighboring texel values, based on a received fractional address in the first mode. A first filter block is to perform a linear interpolation over a first dimension for a first of the two texel groups. A second filter block is to receive output from the first filter block and perform a linear interpolation over a second dimension for the first the two texel groups. A third filter block is to perform a linear interpolation over the first dimension for a second of the two texel groups. A fourth filter block is to receive output from the third filter block and perform a linear interpolation over the second dimension for the second of the two texel groups. The four filter blocks are to output, in the second mode, weighted average over two texel groups, wherein the first filter block is to determine a weighted average for a first texel pair of the first the two texel groups. The second filter block is to determine a weighted average for a second texel pair of the first of the two texel groups. The third filter block is to determine a weighted average for a first texel pair of the second of the two texel groups, and the fourth filter block is to determine a weighted average for a second texel pair of the second of the two texel groups.

In one or more second embodiment, a graphics processing system with a configurable texture filter includes one or more signal input to receive a plurality of texel values and a filter mode signal. A plurality of filter blocks are coupled to the one or more signal input, each filter block having the same logic circuitry, further including a coefficient input to receive a coefficient associated with either a predetermined fractional address or a predetermined weighting coefficient, two texel color inputs, each to receive a texel color value, a first multiplier having a first input coupled to the coefficient input and a second input coupled to a first texel color input, a second multiplier having a first input coupled to the first coefficient input through an invertor and a second input coupled to the second texel color input, and an adder coupled to an output of the first multiplier and an output of the second multiplier, wherein the coupling between the second multiplier and the adder is through a switch responsive to the filter mode signal.

In furtherance of the one or more second embodiment, the logic circuitry further comprises two coefficient inputs, each to receive a coefficient associated with either a predetermined fractional address or a predetermined texel weighting, four texel color inputs, each to receive a texel value, a first multiplier having a first input coupled to a first coefficient input and a second input coupled to a first texel value input, a second multiplier having a first input coupled to the first coefficient input through an invertor and a second input coupled to a second texel value input, a first adder coupled to an output of the first multiplier and the second multiplier, wherein the coupling between the second multiplier and the first adder is through a first switch responsive to the filter mode signal. The logic circuitry further includes a third multiplier having a first input coupled to a second coefficient input and a second input coupled to a third texel color input, a fourth multiplier having a first input coupled to the second coefficient input through an invertor and a second input coupled to a fourth texel color input, a second adder coupled to an output of the third multiplier and the fourth multiplier, wherein the coupling between the second multiplier and the fourth adder is through a second switch responsive to the filter mode signal, and an accumulator coupled to the output of the first and second adders, wherein the accumulator is coupled to the filter mode signal and is to either add together or pass the outputs of the adders based on at least the filter mode signal.

In one or more third embodiment, a method for filtering graphical texture data, the method includes storing a plurality of texel values in a memory of a graphics processing system, performing, in response to a filter mode signal indicating a first filter mode, a bilinear interpolation over a group of neighboring texel values based on coefficients indicative of a fractional address associated with the texels, generating, in response to a filter mode signal indicating a second filter mode, a weighted average over the group of neighboring texel values based on coefficients indicative of a weighting associated with the texel values, and storing the interpolated value or weighted average to memory.

In furtherance of the one or more third embodiment, the method further includes generating, in response to the filter mode signal indicating a first filter mode, a pair of linear interpolated values from the four texel values and one dimension of the fractional address. The method further includes generating, in response to the filter mode signal indicating a second filter mode, a sum of two of the four texel values, a first of the texel values scaled by a first of the coefficients, and a second of the texel values scaled by a second of the coefficients.

In furtherance of the one or more third embodiment, the method further includes generating a first pair of linear interpolated values from the four texel values and one dimension of the fractional address. The method further includes converting each of the first pair of linear interpolated values having a full bit width into a high bit portion and a low bit portion. The method further includes generating a third linear interpolated value based on a second dimension of the fractional address and the low bit portions of the first pair of linear interpolated values. The method further includes generating a fourth linear interpolated value based on the second dimension of the fractional address and the high bit portions of the first pair of linear interpolated values. The method further includes assembling the third and fourth linear interpolated values into a bilinear interpolated value having the full bit width.

In furtherance of the one or more third embodiment, performing the bilinear interpolation further includes generating a first linear interpolated value for a first pair of the texels by multiplying a first coefficient corresponding to the fractional address with a first texel value associated with the first texel pair, multiplying the complement of the first coefficient with a second texel associated with the first texel pair, and summing the results. The method further includes generating a second linear interpolated value for a second pair of the texels by multiplying the first coefficient with a third texel value associated with the second texel pair, multiplying the complement of the first coefficient with a fourth texel value associated with the second texel pair, converting each of the first and second linear interpolated values having a full bit width into a high bit portion and a low bit portion, generating a third linear interpolated value by multiplying a low bit portion of the first linear interpolated value with a second coefficient corresponding to the fractional address, multiplying a low bit portion of the second linear interpolated value with the complement of second coefficient, and summing the results. The method further include generating a fourth linear interpolated value by multiplying a high bit portion of the first linear interpolated value with the second coefficient. multiplying a high bit portion of the second linear interpolated value with the complement of second coefficient, and summing the results. The method further includes assembling the third and fourth linear interpolated values into a bilinear interpolated value having the full bit width.

In furtherance of the one or more third embodiment, generating the weighted average further comprises generating a sum of a first and second of the texel values, the first texel value scaled by a first coefficient, and the second texel value scaled by a second coefficient, generating a sum of a third and fourth of the texel values, the third texel value scaled by a third coefficient, and the fourth texel value scaled by a fourth coefficient, and adding the sums.

In one or more fourth embodiment, a method for filtering graphical texture data includes storing a plurality of texel values and coefficients in a memory of a graphics processing system. The method includes multiplying a coefficient associated with either a predetermined fractional address or a predetermined texel weighting with a first texel value. The method includes adding the first texel value as scaled by the coefficient with a second texel value scaled by a complement of the coefficient in response to a filter mode signal indicative of a bilinear filter mode, and passing the first texel value as scaled by the coefficient, without the adding, in response to the filter mode signal being indicative of a weighted average filter mode. The method includes storing the first texel value as scaled by the coefficient to memory.

In furtherance of the one or more fourth embodiment, the method includes multiplying a first texel value with first coefficient associated with either a predetermined fractional address or a predetermined texel weighting. The method includes generating a first linear interpolated value by adding the first texel value as scaled by the first coefficient with a second texel value scaled by a complement of the first coefficient in response to the filter mode signal being indicative of a bilinear filter mode. The method includes multiplying a third texel value with a second coefficient associated with either a predetermined fractional address or a predetermined texel weighting. The method includes generating a second linear interpolated value by adding the third texel value, as scaled by the second coefficient, with a fourth texel value scaled by a complement of the second coefficient in response to the filter mode signal indicative of the bilinear filter mode. The method includes outputting a graphical object rendered based on the first and second interpolated values to a display screen coupled to the processing system.

In one or more fifth embodiment, at least one computer-readable media stores instructions thereon, which when executed by a processor, cause the processor to perform a method including storing a plurality of texel values and coefficients in a memory of a graphics processing system. The method including performing in response to a filter mode signal indicating a first filter mode, a bilinear interpolation over a group of neighboring texel values based on the coefficients, wherein the two coefficients are indicative of a fractional address associated with the texels. The method further including generating, in response to a filter mode signal indicating a second filter mode, a weighted average over the group of neighboring texel values based on the coefficients, wherein each of the coefficients is indicative of a weighting associated with one of the texel values. The method including storing the interpolated value or weighted average to memory.

In furtherance of the one or more fifth embodiment, the media further includes instructions, which when executed by the processor, cause the processor to perform the bilinear interpolation by the method further including generating a first pair of linear interpolated values from the four texel values and one dimension of the fractional address, converting each of the first pair of linear interpolated values having a full bit width into a high bit portion and a low bit portion, and generating a third linear interpolated value based on a second dimension of the fractional address and the low bit portions of the first pair of linear interpolated values, generating a fourth linear interpolated value based on the second dimension of the fractional address and the high bit portions of the first pair of linear interpolated values, and assembling the third and fourth linear interpolated values into a bilinear interpolated value having the full bit width.

In furtherance of the one or more fifth embodiment, the media further includes instructions, which when executed by the processor, cause the processor to generate the weighted average by the method further comprising generating a sum of a first and second of the texel values, the first texel value scaled by a first coefficient, and the second texel value scaled by a second coefficient, generating a sum of a third and fourth of the texel values, the third texel value scaled by a third coefficient, and the fourth texel value scaled by a fourth coefficient, and adding the sums.

It will be recognized that the implementation is not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the implementation should, therefore, be determined with reference to the appended claims, along with the full scope of equivalents to which such claims are entitled.

What is claimed is:

1. A graphics processing system with a multi-mode texture filter, the filter comprising:
   one or more signal input to receive a plurality of texel values and a filter mode signal;
   logic circuitry communicatively coupled to the one or more signal input, wherein the logic circuitry is operable in a plurality of modes selectable by the filter mode signal, the logic circuitry in a first mode perform bilinear interpolation over a group of neighboring texel values based on coefficients indicative of a fractional texture address, and the logic circuitry in a second mode to perform a weighted averaging over the group of neighboring texel values based on the coefficients, wherein each of the coefficients is indicative of a weighting associated with one of the multiple texel values;
   one or more output signal line communicatively coupled to the logic circuitry to output the filtered texture data;
   wherein the logic circuitry further comprises:
      a first filter block to generate, in the first mode, a first pair of linear interpolated values from four texel values of the group of neighboring texel values and a first dimension of the fractional address;
      a converter coupled to an output of first filter block in the first mode, the converter to convert each of the first pair of linear interpolated values having a full bit width into a high bit portion and a low bit portion;
      a second filter block to:
         generate, in the first mode, a third linear interpolated value based on a second dimension of the fractional address and the low bit portions of the first pair of linear interpolated values;
         generate, in the first mode, a fourth linear interpolated value based on the second dimension of the fractional address and the high bit portions of the first pair of linear interpolated values;
         assemble the third and fourth linear interpolated values into a bilinear interpolated value having the full bit width; and
         output the bilinear interpolated value to the one or more output signal line.

2. The system of claim 1, wherein:
   each filter block in the second mode is to sum a pair of the four texel values with a first of the pairs scaled by a first of the coefficients, and a second of the pair scaled by a second of the coefficients.

3. The system of claim 1, wherein the logic circuitry further comprises:
   an accumulator to output, in the first mode, a sum of the second interpolated values to the one or more output signal line, and to output, in the second mode, the weighted average over the group of four texel values to the one or more output signal line.

4. The system of claim 1, wherein the logic circuitry further comprises:
   the first filter block to generate, in the first mode:
      the first linear interpolated value for a first pair of the texels by:
         multiplying a first texel value associated with the first texel pair with a first coefficient corresponding to the fractional address;
         multiplying a second texel associated with the first texel pair with the complement of the first coefficient; and
         summing the results;
      the second linear interpolated value for a second pair of the texels by:
         multiplying a third texel value associated with the second texel pair with the first coefficient;
         multiplying a fourth texel value associated with the second texel pair with the complement of the first coefficient;
   a converter coupled to an output of first filter block in the first mode, the converter to convert each of the first and second linear interpolated values having a full bit width into a high bit portion and a low bit portion;
   the second filter block to:
      generate, in the first mode, the third linear interpolated value by:

multiplying a low bit portion of the first linear interpolated value with a second coefficient corresponding to the fractional address;
multiplying a low bit portion of the second linear interpolated value with the complement of second coefficient; and
summing the results;
generate, in the first mode, the fourth linear interpolated value by:
multiplying a high bit portion of the first linear interpolated value with the second coefficient;
multiplying a high bit portion of the second linear interpolated value with the complement of second coefficient; and
summing the results.

5. The system of claim 1, wherein the logic circuitry further comprises:
the first filter block to generate, in the second mode, a sum of a first and second of the texel values, the first texel value scaled by a first coefficient, and the second texel value scaled by a second coefficient;
the second filter block to generate, in the second mode, a sum of a third and fourth of the texel values, the third texel value scaled by a third coefficient, and the fourth texel value scaled by a fourth coefficient; and
an accumulator to add the sums and outputting the resulting weighted sum to the one or more output signal line.

6. The system of claim 1, wherein:
the logic circuitry further comprises four filter blocks, each filter block having the same logic circuitry, and is operable in a plurality of modes selectable by the filter mode signal;
the four filter blocks are to output, in the first mode, a bilinear interpolation for two texel groups, each group comprising four neighboring texel values, based on a received fractional address in the first mode; and
the four filter blocks are to output, in the second mode, weighted average over two texel groups.

7. The system of claim 1, wherein:
the logic circuitry further comprises four filter blocks, each filter block having the same logic circuitry, and is operable in a plurality of modes selectable by the filter mode signal;
the four filter blocks are to output, in the first mode, a bilinear interpolation for two texel groups, each group comprising four neighboring texel values, based on a received fractional address in the first mode, wherein:
the first filter block is to perform a linear interpolation over a first dimension for a first of the two texel groups;
the second filter block is to receive output from the first filter block and perform a linear interpolation over a second dimension for the first the two texel groups;
a third filter block is to perform a linear interpolation over the first dimension for a second of the two texel groups; and
a fourth filter block is to receive output from the third filter block and perform a linear interpolation over the second dimension for the second of the two texel groups; and
the four filter blocks are to output, in the second mode, weighted average over two texel groups, wherein:
the first filter block is to determine a weighted average for a first texel pair of the first the two texel groups;
the second filter block is to determine a weighted average for a second texel pair of the first of the two texel groups;
the third filter block is to determine a weighted average for a first texel pair of the second of the two texel groups; and
the fourth filter block is to determine a weighted average for a second texel pair of the second of the two texel groups.

8. A graphics processing system with a configurable texture filter, the filter comprising:
one or more signal input to receive a plurality of texel values and a filter mode signal;
a plurality of filter blocks coupled to the one or more signal input, each filter block having the same logic circuitry, further comprising:
a coefficient input to receive a coefficient associated with either a predetermined fractional address or a predetermined weighting coefficient;
two texel color inputs, each to receive a texel color value;
a first multiplier having a first input coupled to the coefficient input and a second input coupled to a first texel color input;
a second multiplier having a first input coupled to the first coefficient input through an invertor and a second input coupled to the second texel color input; and
an adder coupled to an output of the first multiplier and an output of the second multiplier, wherein the coupling between the second multiplier and the adder is through a switch responsive to the filter mode signal.

9. The system of claim 8, wherein the logic circuitry further comprises:
two coefficient inputs, each to receive a coefficient associated with either a predetermined fractional address or a predetermined texel weighting;
four texel color inputs, each to receive a texel value;
a first multiplier having a first input coupled to a first coefficient input and a second input coupled to a first texel value input;
a second multiplier having a first input coupled to the first coefficient input through an invertor and a second input coupled to a second texel value input;
a first adder coupled to an output of the first multiplier and the second multiplier, wherein the coupling between the second multiplier and the first adder is through a first switch responsive to the filter mode signal;
a third multiplier having a first input coupled to a second coefficient input and a second input coupled to a third texel color input;
a fourth multiplier having a first input coupled to the second coefficient input through an invertor and a second input coupled to a fourth texel color input;
a second adder coupled to an output of the third multiplier and the fourth multiplier, wherein the coupling between the second multiplier and the fourth adder is through a second switch responsive to the filter mode signal; and
an accumulator coupled to the output of the first and second adders, wherein the accumulator is coupled to the filter mode signal and is to either add together or pass the outputs of the adders based on at least the filter mode signal.

10. A method for filtering graphical texture data, the method comprising:
storing a plurality of texel values in a memory of a graphics processing system;
performing, in response to a filter mode signal indicating a first filter mode, a bilinear interpolation over a group of neighboring texel values based on coefficients indicative of a fractional address associated with the texels;
generating, in response to a filter mode signal indicating a second filter mode, a weighted average over the group of neighboring texel values based on coefficients indicative of a weighting associated with the texel values;

storing the interpolated value or weighted average to memory;

wherein performing the bilinear interpolation further comprises:

generating a first pair of linear interpolated values from four texel values of the group of neighboring texel values and one dimension of the fractional address;

converting each of the first pair of linear interpolated values having a full bit width into a high bit portion and a low bit portion; and generating a third linear interpolated value based on a second dimension of the fractional address and the low bit portions of the first pair of linear interpolated values;

generating a fourth linear interpolated value based on the second dimension of the fractional address and the high bit portions of the first pair of linear interpolated values; and assembling the third and fourth linear interpolated values into a bilinear interpolated value having the full bit width.

11. The method of claim 10, wherein the method further comprises:

generating, in response to the filter mode signal indicating a second filter mode, a sum of two of the four texel values, a first of the texel values scaled by a first of the coefficients, and a second of the texel values scaled by a second of the coefficients.

12. The method of claim 10, wherein performing the bilinear interpolation further comprises:

generating a first linear interpolated value of the first pair of linear interpolation values for a first pair of the texels by:
multiplying a first coefficient corresponding to the fractional address with a first texel value associated with the first texel pair;
multiplying the complement of the first coefficient with a second texel associated with the first texel pair; and
summing the results;

generating a second linear interpolated value of the first pair of linear interpolation values for a second pair of the texels by:
multiplying the first coefficient with a third texel value associated with the second texel pair;
multiplying the complement of the first coefficient with a fourth texel value associated with the second texel pair;

converting each of the first and second linear interpolated values having a full bit width into a high bit portion and a low bit portion;

generating the third linear interpolated value by:
multiplying a low bit portion of the first linear interpolated value with a second coefficient corresponding to the fractional address;
multiplying a low bit portion of the second linear interpolated value with the complement of second coefficient; and
summing the results;

generating the fourth linear interpolated value by:
multiplying a high bit portion of the first linear interpolated value with the second coefficient;
multiplying a high bit portion of the second linear interpolated value with the complement of second coefficient; and
summing the results.

13. The method of claim 10, wherein generating the weighted average further comprises:

generating a sum of a first and second of the texel values, the first texel value scaled by a first coefficient, and the second texel value scaled by a second coefficient;

generating a sum of a third and fourth of the texel values, the third texel value scaled by a third coefficient, and the fourth texel value scaled by a fourth coefficient; and adding the sums.

14. A method for filtering graphical texture data, the method comprising:

storing a plurality of texel values and coefficients in a memory of a graphics processing system;

multiplying a coefficient associated with either a predetermined fractional address or a predetermined texel weighting with a first texel value;

adding the first texel value as scaled by the coefficient with a second texel value scaled by a complement of the coefficient in response to a filter mode signal indicative of a bilinear filter mode, and passing the first texel value as scaled by the coefficient, without the adding, in response to the filter mode signal being indicative of a weighted average filter mode;

storing the first texel value as scaled by the coefficient to memory;

multiplying the first texel value with first coefficient associated with either a predetermined fractional address or a predetermined texel weighting;

generating a first linear interpolated value by adding the first texel value as scaled by the first coefficient with the second texel value scaled by a complement of the first coefficient in response to the filter mode signal being indicative of the bilinear filter mode;

multiplying a third texel value with a second coefficient associated with either a predetermined fractional address or a predetermined texel weighting;

generating a second linear interpolated value by adding the third texel value, as scaled by the second coefficient, with a fourth texel value scaled by a complement of the second coefficient in response to the filter mode signal indicative of the bilinear filter mode; and outputting a graphical object rendered based on the first and second interpolated values to a display screen coupled to the processing system.

15. At least one non-transitory computer-readable media, the media storing instructions thereon, which when executed by a processor, cause the processor to perform a method comprising:

storing a plurality of texel values and coefficients in a memory of a graphics processing system;

performing, in response to a filter mode signal indicating a first filter mode, a bilinear interpolation over a group of neighboring texel values based on the coefficients, wherein the two coefficients are indicative of a fractional address associated with the texels;

generating, in response to a filter mode signal indicating a second filter mode, a weighted average over the group of neighboring texel values based on the coefficients, wherein each of the coefficients is indicative of a weighting associated with one of the texel values;

storing the interpolated value or weighted average to memory;

the method further comprising:
generating a first pair of linear interpolated values from four texel values of the group of neighboring texel values and one dimension of the fractional address;

converting each of the first pair of linear interpolated values having a full bit width into a high bit portion and a low bit portion; and generating a third linear interpolated value based on a second dimension of the fractional address and the low bit portions of the first pair of linear interpolated values;

generating a fourth linear interpolated value based on the second dimension of the fractional address and the high bit portions of the first pair of linear interpolated values; and assembling the third and fourth linear interpolated values into a bilinear interpolated value having the full bit width.

16. The media as in claim 15, wherein the media further includes instructions, which when executed by the processor, cause the processor to generate the weighted average by the method further comprising:

generating a sum of a first and second of the texel values, the first texel value scaled by a first coefficient, and the second texel value scaled by a second coefficient;

generating a sum of a third and fourth of the texel values, the third texel value scaled by a third coefficient, and the fourth texel value scaled by a fourth coefficient; and adding the sums.

* * * * *